United States Patent
Le Taillandier de Gabory et al.

(10) Patent No.: US 8,682,178 B2
(45) Date of Patent: Mar. 25, 2014

(54) METHOD AND SYSTEM FOR SETTING TIMING OF PHASE MODULATION OF XPSK TRANSMITTER

(75) Inventors: Emmanuel Le Taillandier de Gabory, Tokyo (JP); Satomi Shioiri, Tokyo (JP)

(73) Assignee: NEC Corporation, Tokyo (JP)

( * ) Notice: Subject to any disclaimer, the term of this patent is extended or adjusted under 35 U.S.C. 154(b) by 522 days.

(21) Appl. No.: 12/999,994

(22) PCT Filed: Jul. 8, 2008

(86) PCT No.: PCT/JP2008/062651
§ 371 (c)(1),
(2), (4) Date: Dec. 17, 2010

(87) PCT Pub. No.: WO2010/004658
PCT Pub. Date: Jan. 14, 2010

(65) Prior Publication Data
US 2011/0091221 A1    Apr. 21, 2011

(51) Int. Cl.
*H04B 10/04*    (2011.01)
(52) U.S. Cl.
USPC ............................ 398/188; 398/198; 398/183
(58) Field of Classification Search
USPC .................................. 398/182–202; 359/279
See application file for complete search history.

(56) References Cited

U.S. PATENT DOCUMENTS

| | | |
|---|---|---|
| 2005/0100281 A1 | 5/2005 | Kim et al. |
| 2006/0263098 A1 | 11/2006 | Akiyama et al. |
| 2007/0047954 A1 | 3/2007 | Mamyshev |
| 2007/0264028 A1 | 11/2007 | Yuki et al. |

FOREIGN PATENT DOCUMENTS

| | | | |
|---|---|---|---|
| CN | 1614498 A | 5/2005 | |
| EP | 1727303 A | 11/2006 | |
| EP | 1764935 A | 3/2007 | |
| JP | 2007043638 A | 2/2007 | |
| JP | 2007082094 A | 3/2007 | |
| JP | 2007329886 A | 12/2007 | |
| JP | 2008048150 A | 2/2008 | |
| WO | 2007025037 A | 3/2007 | |
| WO | WO 2007/025037 | * 3/2007 | ............ H04B 10/08 |

OTHER PUBLICATIONS

International Search Report for PCT/JP2008/062651 mailed Apr. 17, 2009.
X, Wu et al., "Experimental Synchronization Monitoring of I/Q Misalignment and Pulse Carving Misalignment in 20-Gbit/s RZ-DQPSK Data Generation", ECOC 2007, Sep. 2007.
X. Wu et al., "Experimental Synchronization Monitoring of I/O Data and Pulse-Carving Temporal Misalignment for a Serial-Type 80-Gbit/s RZ-DQPSK Transmitter", OFC/NFOEC 2008, Feb. 2008.
Chinese Office Action for CN Application No. 200880129978.0 issued on Mar. 28, 2013 with English Translation.

* cited by examiner

*Primary Examiner* — M. R. Sedighian
(74) *Attorney, Agent, or Firm* — Sughrue Mion, PLLC

(57) ABSTRACT

A method is provided for setting a timing of phase modulation by a target phase modulator within an optical transmitter which performs $2^n$ order phase shift keying, n being a natural number equal to or more than two. The method is provided with: feeding a specific pattern to the optical transmitter to allow the xPSK transmitter to emit an optical carrier in accordance with the specific pattern; receiving the optical carrier by a delay interferometer; converting a pair of light signals emitted from constructive and destructive outputs of the delay interferometer into an electrical signal; detecting a peak to peak value of the electrical signal; and setting the timing of the phase modulation by the target phase modulator so as to minimize the peak to peak value of the electrical signal.

22 Claims, 15 Drawing Sheets

METHOD AND SYSTEM FOR SETTING TIMING OF PHASE MODULATION OF XPSK TRANSMITTER

The present application is the National Phase of PCT/JP2008/062651, filed Jul. 8, 2008.

TECHNICAL FIELD

The present invention relates generally to an optical transmitter emitting a light signal modulated with high order Phase Shift Keying (xPSK), more particularly, to timing control of phase modulation within an xPSK optical transmitter of the order x, where x is equal to or higher than four.

BACKGROUND ART

An optical sub-module is provided within an optical communication system and used to emit light signals into a transmission medium. An optical sub-module, which emits light signals withholding the information of an electrical data pattern applied at the input interface of the sub-module, may be referred as a transmitter. An optical sub-module, which has a part receiving light signal and converting its information into an electrical signal can be referred as a receiver. An optical sub-module, which has a part being referred as a transmitter and another part being referred as a receiver, may be referred as a transponder.

Transmitters can use several options of modulation formats to imprint the information of the electrical data on the light signal. One modulation format is phase shift keying. With xPSK, the information is imprinted on the phase of each symbol of an optical carrier. The number of discrete phase levels on which the information is mapped can be referred as the order of PSK modulation. One example is binary PSK modulation, which can also be referred as PSK modulation of order 2 or 2PSK. Another example is quadrature phase shift keying (QPSK), which can also be referred as PSK of order 4 or 4PSK. For QPSK, one symbol has four possible phase values ($0, \pi, \pi/2, 3\pi/2$ in radians, modulo $2\pi$), mapping therefore two bits of binary data on one symbol of the light signal.

The xPSK modulation of an order equal to or higher than four may be referred as high order xPSK modulation. For high order xPSK modulation, each symbol of light signal has more than two states. Therefore, each symbol of light signal withholds information for more than one bit of binary electrical information. Thus, the bit rate of the input binary electrical data of a high order xPSK transmitter and the symbol rate of the light signal emitted by the transmitter will be different. This assertion is true in terms of bit period and symbol period.

A particular form of xPSK modulation is differential phase shift keying of order x (DxPSK), where the data information is not mapped directly on the phase levels of the light signal, but on the difference between the phases of consecutive symbols of the light signal. The difference between an xPSK transmitter and a DxPSK transmitter of the same order is the mapping of the information. However, other aspects of the transmitters, including the modulation of the light signal, can be identical. Therefore, when the data mapping method is not specified, DxPSK transmitters can be referred as xPSK transmitters.

For a high order xPSK transmitter, the information is mapped on more than two phase values. There are three schemes of phase modulation for these transmitters. In the first scheme, one single modulator device imprints all possible phase values. Parallel modulators usually comprise several parallel arms, on which the input optical carrier is coupled, phase modulated independently by each arm, shifted by a fixed amount of phase depending on the arm, and mixed. The resulting modulation phase is a vectorial summation of the phase vectors of each arm. This scheme has the advantage of integration but these devices are difficult to manufacture and voltage driving is not trivial because higher amplitudes are required. In the second scheme, consecutive phase modulators modulate the phase of a continuous optical carrier sequentially. Each modulator can imprint two different phases on the carrier and the light modulated by the modulator travels to the next modulators. Finally, the optical carrier having been modulated sequentially by each phase modulated is emitted into the transmission medium. The resulting modulation phase is a scalar summation of the modulated phases of each modulator. This scheme multiplies the number of modulators but has the advantage of using simple devices with trivial voltage driving. The third scheme is a hybrid scheme of the first scheme and the second scheme. Transmitters, in which the phase modulation is performed according to the first scheme; may be referred as parallel xPSK transmitters. Transmitters, in which the phase modulation is performed according to the second scheme or the third scheme, may be referred as serial xPSK transmitters. For a parallel xPSK modulator, each arm of the modulator must be driven by a voltage corresponding to a set of binary data. For a serial xPSK modulation, a driving voltage corresponding to a set of binary data has to be implemented for each phase modulator. If the coding of binary data is performed outside the transmitter and if the transmitter has an input for each set of binary data required by the modulator driving scheme, no additional coding is required on the transmitter. Otherwise, a coder is implemented on the transmitter, which determines the phase to be modulated by each modulator or each arm of modulator and dispatches an electrical voltage accordingly.

In the case of a serial high order xPSK transmitter, the phase imprinted by each modulator sequentially is desirably synchronized with the light signal travelling to the modulator. Therefore once phase signal has been imprinted to the optical carrier by the first phase modulator, the timing of phase modulation at each following phase modulator is set so that the time difference between the electrical data signal corresponding to the phase to be imprinted by the following modulator and the light travelling to the modulator is null. If the time difference is more than one symbol period in the absolute value, the imprinted phase does no longer correspond to the phase required to map the data and the information of the emitted light signal is corrupted. If the time difference in the absolute value is less than one symbol period but not null, the imprinted phase information is correct but the imprinted phase shifted from the ideal phase has a direct impact on the bit error rate (BER) of the demodulated signal after transmission. In the same way, for a parallel xPSK transmitter, it is desired that timings of the light symbols modulated by the respective arms of a modulator match one another, when they are mixed. Therefore, it is desired that the times during which each binary pattern travels to the corresponding arm and during which each modulated light symbols modulated by the corresponding arm travels to the mixing point match each other. If the time difference is more than one symbol period in the absolute value, the imprinted phase does no longer correspond to the phase required to map the data and the information of the emitted light signal is corrupted. If the time difference in the absolute value is less than one symbol period but not null, the imprinted phase information is correct but the imprinted phase shifted from the ideal phase has a direct impact on the BER of the demodulated signal after transmission.

The ways to change the timing difference are: to change the length of the optical path between consecutive phase modulators for serial modulation, or on each arm of the modulator for parallel modulation, by changing the refraction index or the length of the path; to change the length of the electrical path of, on which the data travel to the consecutive phase modulators for serial modulation or to each arm of the modulator for parallel modulation, for instance using an electrical phase shifter; to use a buffer to delay the binary pattern by a number of binary bits different for each binary data stream; and to use any combination of the precedent ways.

Precise designing and manufacturing of the serial high order transmitter may provide a fair match for the timing; however, it offers no way to guarantee the match within a symbol period for high symbol rates. Moreover, there is no way to optimize the timing. In addition, for higher speed applications, on a constant modulation format, the symbol period decreases, therefore the timing of the phase modulation performed by each phase modulator has to be set more precisely at constant signal quality. Moreover, designing constraints for transmitters may require or may be relaxed by the design of different lengths for electric paths to each phase modulator for serial modulation or to each arm of a serial modulator. Therefore, it is desired that the timing of modulation is carefully calibrated.

When manufacturing, calibrating or setting parameters of a serial high order xPSK transmitter, the timing of phase modulation at each phase modulator following the initial one is desirably set within a symbol period of the transmitter so that the information imprinted on the emitted optical carrier is correct. The optimization of the transmission characteristics of the transmitter requires further setting of the timing.

When manufacturing, calibrating or setting parameters of a parallel high order xPSK transmitter, the timing of phase modulation at each arm is desirably set within a symbol period of the transmitter so that the information imprinted on the emitted optical carrier is correct. The optimization of the transmission characteristics of the transmitter requires further setting of the timing.

When the wavelength of the transmitter is tunable, changing the emitted wavelength changes the optical path of the light signal inside the transmitter. Thus, the timing is desirably set accordingly to the change of wavelength.

Various approaches have been proposed to set the timing of the phase modulation within an xPSK (or DxPSK) transmitter. Japanese Laid Open Patent Application No. JP-P2007-43638A discloses a technique for setting the timing of the phase modulation for a parallel RZ-DQPSK (return to zero QPSK) transmitter. In this transmitter, a low frequency signal with a frequency of $f_0$ is added to the driving voltage of each modulator arm, and the $2f_0$ frequency component of the output light signal is detected by a photo detector and a band pass filter (or a low pass filter). One of the modulator arms incorporates a phase shifter, and the phase shift of the phase shifter is controlled in response to the $2f_0$ frequency component of the output light signal.

Japanese Laid Open Patent Application No. JP-P2007-82094A also discloses a technique for setting the timing of the phase modulation for a parallel RZ-DQPSK (return to zero QPSK) transmitter. In this transmitter, a frequency component of the output light signal in a predetermined frequency range other than the symbol frequency and the harmonic frequencies thereof is detected by using a photo-detector and a band pass filter (or a low pass filter). The phase shift of a phase shifter within a modulation arm is controlled in response to the detected frequency component. Japanese Laid Open Patent Application No. JP-P2007-329886 discloses a similar technique in which the timing of the phase modulation of each modulation arm, instead of the phase shift of the phase shifter, is controlled in response to frequency component of the output light signal in a predetermined frequency range other than the symbol frequency and the harmonic frequencies thereof.

Furthermore, Wu et al., in "Experimental Synchronization Monitoring of I/Q Misalignment and Pulse Carving Misalignment in 20-Gbit/s RZ-DQPSK Data Generation", ECOC 2007, paper 3.5.5, present a method which can be used to set the timing of modulation for a parallel QPSK transmitter. However, this method cannot be used to set the timing of modulation for a serial transmitter. Moreover, this method has a narrow tuning range limited to one symbol on the timing.

In addition, Wu et al., in "Experimental Synchronization Monitoring of I/Q Data and Pulse-Carving Temporal Misalignment for a Serial-Type 80-Gbit/s RZ-DQPSK Transmitter", OFC 2008 paper OTuG2, present an other method, which can be used to set the timing of modulation for a serial 4PSK transmitter. However, this method has a narrow tuning range limited to one symbol on the timing and requires an optical spectrum analyzer, which is bulky and expensive measurement equipment.

Japanese Laid Open Patent Application No. JP-P2008-48150A discloses a technique for detecting and adjusting the delay and gain mismatch of a delay interferometer within an optical receiver. In this technique, differential output light signals of the delay interferometer are detected by a differential photo-detector pair and the output of the differential photo-detector pair is analyzed by a spectrum analyzer.

However, there is room for improvement in configuration simplicity, tuning range, and speed of the timing setting of the phase modulation within a high order xPSK transmitter. There is a need for simple, fast and wide-range setting of the timing of phase modulation, which can be used for both serial and parallel types of high order xPSK transmitter.

DISCLOSURE OF INVENTION

An object of the present invention is to provide a simple and quick method of and a compact and less expensive system for setting and optimizing the timing of the phase modulation performed with a tuning range wider than one symbol period and valid for both serial and parallel high order xPSK transmitters.

In an aspect of the present invention, a method is provided with: setting a timing of phase modulation by a target phase modulator within an optical transmitter which performs phase shift keying of an order equal to or higher than four. The setting step includes: feeding a specific pattern to the optical transmitter to allow the xPSK transmitter to emit an optical carrier in accordance with the specific pattern; receiving the optical carrier by a delay interferometer; converting a light signal emitted from the delay interferometer into an electrical signal; detecting a peak to peak value of the electrical signal. The timing of the phase modulation by the target phase modulator is set so as to minimize the peak to peak value of the electrical signal.

In another aspect of the present invention, an optical transmitter, which performs phase shift keying of an order equal to or more than four, is provided with an xPSK modulator, a delay interferometer, a photo-detector, a peak-to-peak detector, and a feedback circuit. The xPSK modulator includes a plurality of phase modulators modulating an optical carrier.

The delay interferometer is configured to receive a portion or whole of the optical carrier. The photo-detector converts a light signal emitted from the delay interferometer into an electrical signal. The peak-to-peak detector detects a peak-to-peak value of the electrical signal. The feedback circuit is adapted to set a timing of phase modulation performed by a targeted one of the phase modulators in response to the peak-to-peak value.

In still another aspect of the present invention, an optical transponder is provided with: an xPSK modulator of an order equal to or higher than four, a demodulator, a peak-to-peak detector, and a feedback circuit. The xPSK modulator includes a plurality of phase modulators. The demodulator includes: a plurality of delay interferometers adapted to receive a portion or whole of an optical carrier emitted by the xPSK modulator; and a plurality of photo-detectors converting light signals respectively received form the delay interferometers into electrical signals. The peak-to-peak detector detects a peak-to-peak value of one of the electrical signals. The feedback circuit is adapted to set a timing of phase modulation performed by a target one of the phase modulators in response to the peak-to-peak value.

BRIEF DESCRIPTION OF THE DRAWINGS

The above and other advantages and features of the present invention will be more apparent from the following description taken in conjunction with the accompanied drawings, in which.

BEST MODE FOR CARRYING OUT THE INVENTION

Figure 1:
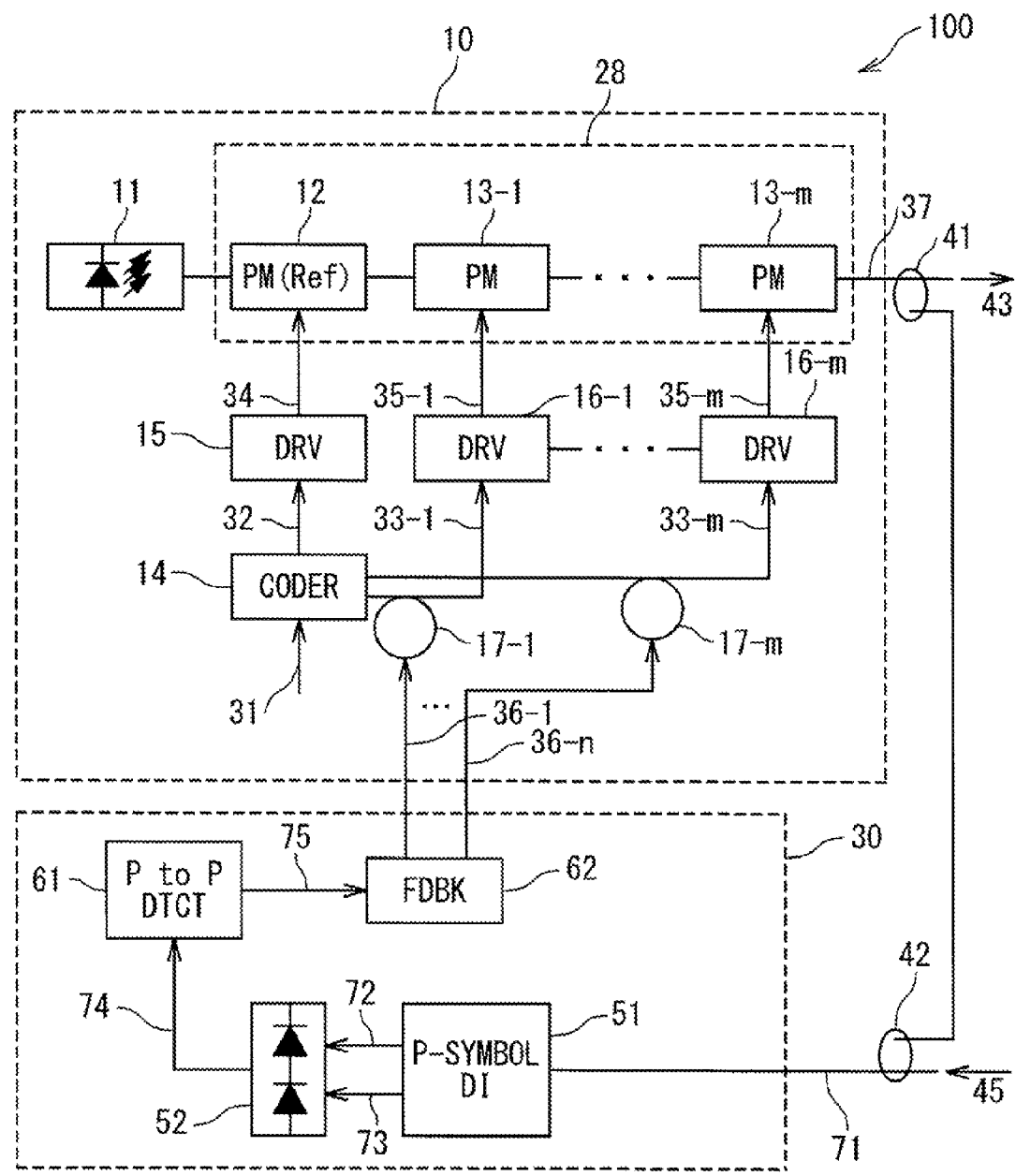
FIG. 1 is a schematic representation of an exemplary configuration of a serial DxPSK transmitter according to the present invention.

FIG. 1 is a schematic representation of an exemplary xPSK transmitter 100 which order is four or higher than four, in one exemplary embodiment of the present invention. The system 10 is an optical sub-module, the system 30 is a control system 30, components 41 and 42 are respectively a divider and a coupler. The sub-module, the system 30 as well as the components 41 and 42 may be integrated on the serial xPSK transmitter 100.

Alternatively, the sub-module may be considered as an independent serial xPSK transmitter and the system 30 as well as components 41 and 42 as external means to set the timing of modulation of the sub-module 10.

The sub-module 10 emits a light signal 37 modulated with high order Phase Shift Keying (xPSK) which order x of modulation is $2^n$, where n is strictly higher than 2. The control system 30 is adapted to monitor the light signal 37 and to provide setting of the timing of the phase modulation in the sub-module 10 in response to the light signal 37. In this embodiment, the divider 41 and the coupler 42 feeds the portion of the light signal 37 to the input port of the control system 30 when the timing of the phase modulation in the sub-module 10 is set. In an alternative embodiment, the divider 41 and the coupler 42 may be replaced with optical switches. In this case, the optical switches feed the whole of the light signal 37 to the input port of the control system 30 when the timing of the phase modulation in the sub-module 10 is set.

The serial xPSK sub-module 10 is provided with a laser 11, a set of serially-connected phase modulators 12, 13-1 to 13-$m$, forming the group 28, a coder 14, a set of drivers 15, 16-1 to 16-$m$, and a set of tunable phase shifters 17-1 to 17-$m$, where m is n−1, that is, m is a natural number higher or equal to one.

The laser 11 is a light source emitting continuous carrier light at a wavelength used for optical communications. The group 28 of phase modulators 12 and 13-1 to 13-$m$ modulate the phase of the optical carrier emitted by the laser 11. The phase modulator 12 is taken as a phase reference, and therefore the phase modulator 12 may be also referred to as the reference phase modulator 12. The phase modulators 13-1 to 13-$m$ are targeted modulators for which the timings of the phase modulation are to be correctly set accordingly to the reference phase modulator 12.

The coder 14 receives a binary data pattern 31 and transforms the binary data pattern 31 into electrical information signals sent to the drivers 15 and 16-1 to 16-$m$ through the electrical paths 32 and 33-1 to 33-$m$, respectively. The drivers 15 and 16-1 to 16-$m$ feed drive voltages to the phase modulators 12 and 13-1 to 13-$m$ through electrical paths 34 and 35-1 to 35-$m$, respectively, and thereby drive the phase modulators 12 and 13-1 to 13-$m$, respectively. The phase modulators 12 and 13-1 to 13-$m$ imprint the information of the binary data pattern 31 on the light signal 37 in accordance with the drive voltages.

Tunable phase shifters 17-1 to 17-$m$ are placed on the electrical paths 33-1 to 33-$m$ of the electronic signals between the coder 14 and the phase modulators 13-1 to 13-$m$, for which the timings of the phase modulation are to be set. The tunable phase shifters 17-1 to 17-$m$ may be based on mechanical tuning, voltage tuning or electro-mechanical tuning.

The control system 30 is provided with a P-symbol delay interferometer (DI) 51, a balanced photo-detector 52, a peak-to-peak detection circuit 51, and a feedback circuit 62. The input port of the P-symbol delay interferometer 51 is connected to the output port of the coupler 42 to receive an input light signal 71. Both of the constructive and destructive outputs of the delay interferometer 51 are connected to the balanced photo-detector 52 to convert the output light signals 72 and 73 from the output ports of the delay interferometer 51 into an electric signal 74. The peak-to-peak detection circuit 61 detects the peak-to-peak characteristics of the electric signal 74. In this exemplary embodiment, the electric signal 74 is a voltage signal and the peak-to-peak detection circuit 61 detects the peak-to-peak voltage of the electric signal 74. The feedback circuit 62 tunes the tunable phase shifters 17-1 to 17-$m$.

Figure 2:
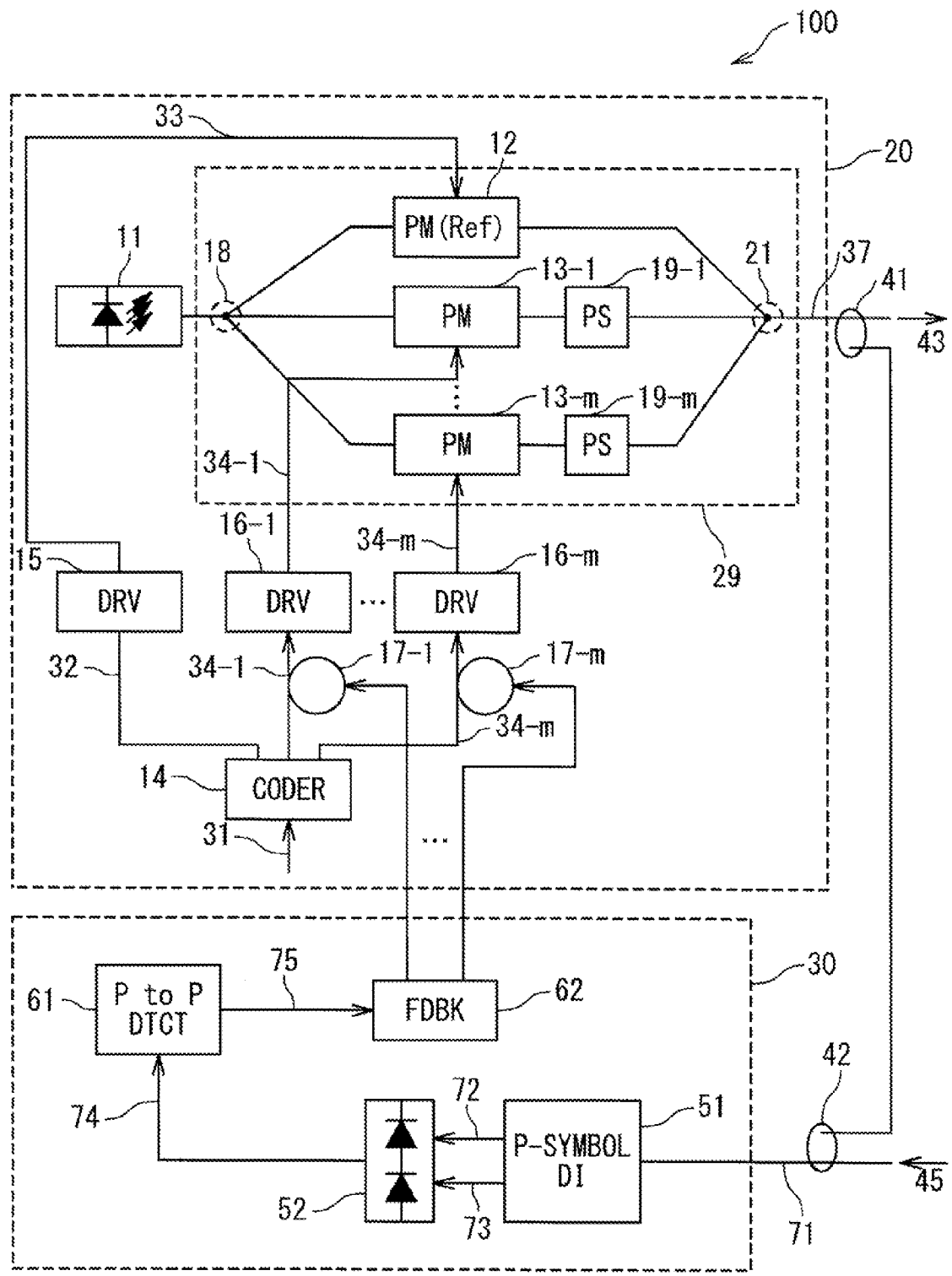
FIG. 2 is a schematic representation of an exemplary configuration of a parallel DxPSK transmitter according to the present invention.

In an alternative implementation, as shown in FIG. 2, a sub-module 20 is used in place of the sub-module 10. The configuration of the sub-module 20 is similar to that of the sub-module 10, except of that the phase modulators 12 and 13-1 to 13-$m$, with the corresponding phase shifting elements 19-1 to 19-$m$, are nested on (m+1) parallel arms of the parallel xPSK modulator 29. The phase shifting elements 19-1 to 19-$m$ are typically longer optical path or portions of the optical path with higher refractive index. The parallel arm on which the reference phase modulator 12 is nested may be referred to as the reference arm. In detail, the light signal emitted by the laser 11 is distributed to the respective modulator arms by a beam splitter 18. The optical carriers of the respective arms are recombined by a directional coupler 21 and are emitted through the port of the sub-module 20.

Identically, the sub-module 20, the system 30 and the components 41 and 42 may be integrated on the xPSK transmitter 100. Alternatively, the sub-module 20 can be considered as an independent parallel xPSK transmitter and the system 30 as well as the components 41 and 42 as external means to set the timing of modulation inside 20.

Figure 3:
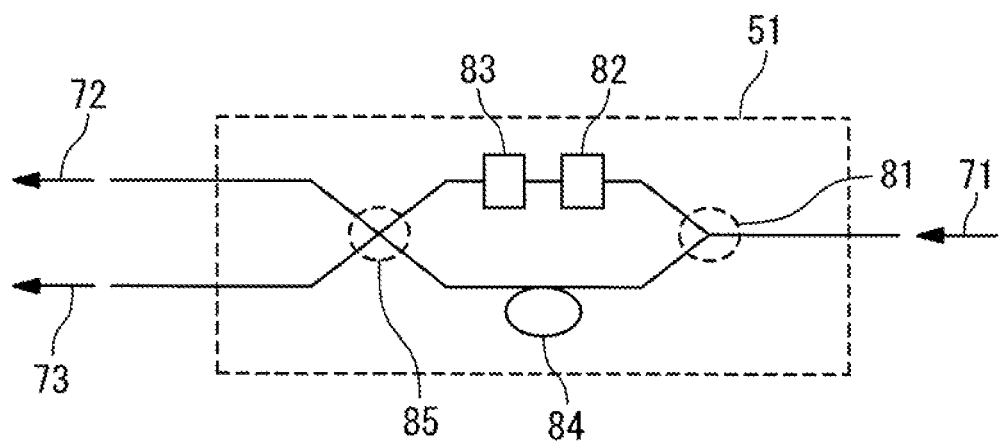
FIG. 3 is a schematic representation of an exemplary configuration of a P-symbol delay interferometer.

FIG. 3 is a schematic representation showing an exemplary configuration of the P-symbol delay interferometer 51 based on a Mach-Zehnder structure. The received light signal 71 is distributed to two optical paths of the interferometer 51 by a beam splitter 81. The paths are recombined at a directional coupler 85. The first path, which may be referred to as the longer arm, includes a P-symbol delay section 84. The second path, which may be referred to as the shorter arm, includes adjustable delay sections: a tuning section 82 which tunes the delay of the second path in response to the wavelength of the received light signal 71; and a phase adjustment section 83 used to shift the intensity maximum of the output light signals 72 or 73 to a certain phase value. The output light signals 72 and 73 are emitted from the constructive and destructive outputs of the interferometer 51, respectively, and fed to the balanced photo-detector 52.

In this exemplary embodiment, an improved method for setting the timings of the phase modulation of the phase modulators 13-1 to 13-$m$ is provided, which is applicable to both of the serial xPSK transmitter shown in FIG. 1 and the parallel xPSK transmitter shown in FIG. 2.

In setting the timing of the phase modulation of a targeted one of the phase modulator 13-1 to 13-$m$, which may be also referred to as the target phase modulator 13-$z$, hereinafter, a specific pattern is used as the binary data pattern 31 for the serial xPSK modulation in the sub-module 10 or the parallel xPSK modulation in the sub-module 20. The optical carrier emitted by the sub-module 10 or 20 passes through the delay interferometer 51 to convert the phase difference between symbols into the amplitude difference. Then the light carrier is received with the balanced photo-detector 52 to convert the optical signal into the electric signal 74, and the peak-to-peak characteristics of the electric signal 74 are used to set the phase modulation timing, of the target phase modulator 13-$z$.

The specific pattern is precisely defined, so that the peak-to-peak characteristics depend on the timing of the target phase modulator 13-$z$ and so that the peak-to-peak value is minimal for a perfect setting of the timing. The use of a random pattern or a pattern contravening the definition of the specific pattern for the binary data pattern 31 results in the peak-to-peak characteristics which do not allow setting the timing of phase modulation. To enable this property, the specific pattern is carefully chosen as follows:

Properties of the Specific Pattern:

Property 1:

The specific pattern is determined to allow a unique minimum of the peak-to-peak characteristics on the whole tuning range of the timing of phase modulation performed by the target phase modulator 13-$z$.

Property 2:

The specific pattern is determined so that the difference of the phases between symbols separated by a fixed number of symbols is correctly converted into amplitude information by the delay interferometer 51. Therefore, the delay of the delay interferometer 51 is said fixed number of symbols. In that case, the peak-to-peak characteristics of the electrical signal 74 (in this exemplary embodiment, the peak-to-peak voltage of the electrical signal 74) reflect the phase difference between symbols of the optical carrier emitted by the sub-module 10 or 20 separated by the fixed amount of symbols.

Property 3:

The specific pattern is chosen so that in the case of a perfect match of the timing of the phase modulation, the phase difference between symbols is limited to one value or two values resulting in the same amplitude after passing through the delay interferometer 51. Indeed, three phase values, which are not congruent, result into at least two amplitude values after passing through the delay interferometer 51. This means that either the phase difference between symbols is constant or the axis formed by the phase difference between the symbols corresponding to constructive interference of the delay interferometer 51 and the phase difference between the symbols corresponding to destructive interference of the delay interferometer 51 is a symmetry axis for the set of phases differences between symbols in the case of the perfect match of the timing. In that case, both phase difference values have the same projection point on the axis.

Property 4:

Only the phase differences between symbols obtained in the case of a perfect match of the timings of the phase modulation performed by the target phase modulators 13-$z$ correspond to a single amplitude value after the optical carrier passed through the delay interferometer 51. This means that for non perfect match of the timing, the phase difference between symbols is not constant (Sub Property 4-A) and that the axis is not a symmetry axis for the set of phase difference between symbols (Sub Property 4-B).

If the specific pattern has the properties described above, the peak-to-peak characteristics of the electrical signal 74 present the absolute minimum for a perfect match of the timing. Other patterns do not enable to set the timing of the phase modulation performed by the target phase modulators 13-$z$ according to the peak-to-peak characteristics.

Next follows the formal definition of the specific pattern according to the properties:

There are m phase modulators other than the target phase modulator 13-$z$ in the transmitter 100, where m is a natural number equal to or larger than one. It should be noted that the m phase modulators includes the reference phase modulator 12. The target phase modulator 13-$z$, for which the timing of the phase modulation is to be set, shifts the phase of the optical carrier by 0 or $2\pi/h$ radians. When the target phase modulator 13-$z$ is nested on one arm of the parallel modulator 29, h can be taken as h=4 or h=−4. When the target phase modulator 13-$z$ is a phase modulator inside the serially connected modulators 28, h is determined by the phase modulation to be performed by the target phase modulator 13-$z$, and h>2. A set $\Phi$ is defined as the set of phase states which are susceptible to be imprinted onto the optical carrier by the reference modulator 12 and the phase modulators 13-1 to 13-$m$ for which the timing of modulation has been already set. This excludes the modulator 13-$z$ for which the timing of modulation is currently set. In the case where the timing of modulation of none of the phase modulators has been set, $\Phi$ is defined as the set of phase states which are susceptible to be imprinted onto the optical carrier by the reference phase modulator 12. 0 radian is always part of the set $\Phi$ as any phase state in $\Phi$ can be taken as a reference. The states of the output light signal in the set $\Phi$ have a constant amplitude.

A pattern of N binary symbols is used as the specific pattern, which information is imprinted on the optical carrier. This corresponds to a pattern of A symbols, where N=n·A where n is the logarithm of base 2 of the modulation order. $\phi(i)$ represents the phase of the $i^{th}$ symbol of the optical carrier emitted by the sub-module 10 or 20 in the case of a perfect match of the timings of the modulation performed by the target phase modulator 13-$z$. The phase $\phi(i)$ is imprinted according to the set of binary bits mapped on the $i^{th}$ symbol. $\phi_m(i)$ represents the phase imprinted by the m phase modulators (other than the target phase modulator 13-$z$) on the $i^{th}$ symbol of the optical carrier, and $\phi_0(i)$ represents the phase imprinted on the $i^{th}$ symbol of the optical carrier by the target phase modulator 13-$z$, for which the timing of phase modulation is to be set. It holds:

$$\phi(i)=\phi_m(i)+\phi_0(i).$$

By notation if the natural numbers i and l are congruent modulo A, $$\phi(i)=\phi(l),$$

$$\phi_m(i)=\phi_m(l), \text{ and}$$

$$\phi_0(i)=\phi_0(l)$$

This corresponds to the case of the same symbol but on different repetitions of the specific pattern. For any natural number b, we define the set of phase states:

$$\Theta(h)=\{(\phi(i+h)-\phi(i))^\wedge(0\le i<A)\},$$

which corresponds to the phase difference between symbols distant of b symbols emitted by the sub-module 10 or 20, when the specific pattern is transmitted. The states of the light signal in $\Theta(b)$ have a constant amplitude.

The specific pattern is chosen as follows:
1. The length A of the specific pattern is chosen so that the time duration of the specific pattern is longer than the setting range of the timing of the phase modulation performed by the target phase modulator 13-$z$; This corresponds to Property 1.
2. There exists a unique non null natural number P strictly lower than A and two phase states $\phi 1$ and $\phi 2$ in $\Phi$, the degeneracy case $\phi 1=\phi 2$ being possible, defining a set of two distinct phase states $\Theta_{MAX}=\{(\phi 1);(\phi 2+2\pi/h)\}$ so that $\Theta(P)\subseteq\Theta_{MAX}$ and $(\phi 2+2\pi/h)\in\Theta(P)$; this corresponds to Properties 2 and 3, where the axis formed by the phase for constructive interference of the delay interferometer 51 and its antiphase is an axis of symmetry of $\Theta(P)$.
3. In addition, we define the phase difference between symbols separated by P symbols as $$\psi(i,j)=\phi_m(j+P)-\phi_m(j)+\phi_0(i+j+P)-\phi_0(i+j),$$

where P is defined in the previous condition and, for which $\psi(0,j)=\phi(j+P)-\phi(j)$. $\psi(i,j)$ is equivalent to the phase difference for the $j^{th}$ symbol when a timing of the phase modulation is delayed by i symbol periods.

For any non null natural number i, strictly lower than A, it holds:

$$(\exists j^\wedge\exists k)^\wedge(0\le j<A)^\wedge(0\le k<A)^\wedge(k\ne j)^\wedge(\psi(i,j)\ne\psi(i,k)),$$

which corresponds to the sub property 4-A. In addition, it holds:

$$(\exists j')^\wedge(0\le j'<A)^\wedge(\forall k')^\wedge(0\le k'<A)^\wedge(k'\ne j')^\wedge((\psi(i,j')+\psi(i,k'))\ne(\phi 1+\phi 2 2\pi/h),$$

which corresponds to the sub property 4-B.

If the set $\Theta(P)$ has two phase value elements, then the set $\Theta_{MAX}$ and the set $\Theta(P)$ are equal. In that case, the axis of symmetry of $\Theta(P)$, on which $\Theta(P)$ has only one projection for its both values, is formed by the phase $(\phi 1+\phi 2 2\pi/h)/2$ and its antiphase. This case is always valid. If the set $\Theta(P)$ has only one phase value element, namely $(\phi 2 2\pi/h)$, the axis of symmetry of $\Theta(P)$ can be formed by the phase value and its antiphase. In that case, P must be chosen so that P symbol periods are wider than the tuning range of the timing of phase modulation performed by the target phase modulator 13-$z$. Accordingly, the specific pattern must be longer than P symbols.

Moreover, when the specific pattern is applied to the coder 14, all of the phase modulators 13-1 to 13-$m$ for which timing has not been set and which are not being set cause only a constant phase shift. In the case of one arm of the parallel xPSK modulator 29 being set, if the parallel xPSK modulator 29 has more than two arms, all arms other than the arm being set and the reference arm must be set so that the light signals are shut on these arms. In that case, if the arms have a Mach-Zehnder modulator, this can be done by setting the Mach-Zehnder modulator voltage to $V\pi$, namely the voltage corresponding to destructive interferences inside the Mach-Zehnder. Also, if the arms each have a shutter device, this can be done by using this shutter device.

The light emitted by the sub-module 10 or 20 is partially or totally directed to a P-symbol delay interferometer 51, where P is defined in the above-described pattern conditions. The shorter arm of the delay interferometer 51 has an additional phase shift of the phase defined by the axis of symmetry of $\Theta(P)$, on which $\Theta(P)$ has only one projection. In the case where the set $\Theta(P)$ has two distinct elements, the additional phase shift is $(\phi 1+\phi 2 2\pi/h)/2$ in radians modulo $\pi$ radians, where $\phi 1$ and $\phi 2$ are defined in the above-described pattern conditions.

The light signal emitted by the modulator 10 or 20 is converted to the electric signal 74 by the balanced photo detector 52 after passing through the delay interferometer 51. The peak-to-peak detection circuit 61 detects the peak-to-peak amplitude of the electric signal 74, which corresponds to the pattern information. The second condition of the definition of the specific pattern ensures that the peak-to-peak amplitude is minimal when the timing of phase modulation is perfectly set. The third and fourth conditions of the definition of the specific pattern ensure that there are no other minima on the setting range of the timing. The timing adjustment may be performed by changing the length of the optical path between the phase modulators 13-1 to **13-*m*, for instance by changing the length of the path or the refractive index of the path. The timing adjustment may alternatively be performed by shifting the electrical data driving the phase modulators 13-1 to 13-*m*, for instance by using an electrical phase shifter. The timing adjustment may also be performed by using a buffers on the binary data used to drive the phase modulators 13-1 to 13-*m***.

If the timing to be set is for one phase modulator of the group of serially connected modulators 28, the present invention may be used as said with $\Theta(P)$ composed of one or two distinct elements.

If the timing to be set is for one arm of the parallel modulator 29 in reference to one other arm of the parallel modulator 29, and if both of the arms have a relative phase difference of $\pi/2$, the set of phases which can be achieved when both of the arms are modulating the light signal is composed of four distinct phases, each one separated from the adjacent ones by $\pi/2$ radians. All states correspond to the same amplitude of the light signal. The present invention may be used as said with $\Theta(P)$ composed of one or two distinct elements.

If the timing to be set is for one arm of the parallel modulator 29 in reference to one other arm of the same modulator, and if both of the arms have a relative phase difference of a value different from $\pi/2$ radians, the set of phases which can be achieved when both arms are modulating the light signal is composed of four distinct phases, each one separated from the adjacent ones by $\pi/2$ radians. However, these states correspond to two different amplitude of the light signal, adjacent states having different amplitudes. The present invention can, be used with the case where the set $\Theta(P)$ has only one element, $\Theta(P)=\{(\phi 2+2\pi/h)\}$. As the amplitudes of two adjacent states of the phase after the parallel modulator 29 are different, the projection of two distinct elements of $\Theta(P)$ on the axis would be different, so the case where the set $\Theta(P)$ has two distinct elements does not fulfill the hypothesis on the specific pattern definition and cannot be used.

In one exemplary embodiment, the specific pattern may be periodic, of N binary bit period length, and the pattern during a single period is defined in the above-described pattern conditions. The peak-to-peak detection may be performed continuously.

The specific pattern may be generated according to parameters, which include: the tuning range of the timing, the bit rate, the number of modulators and their characteristics.

Figure 4A:
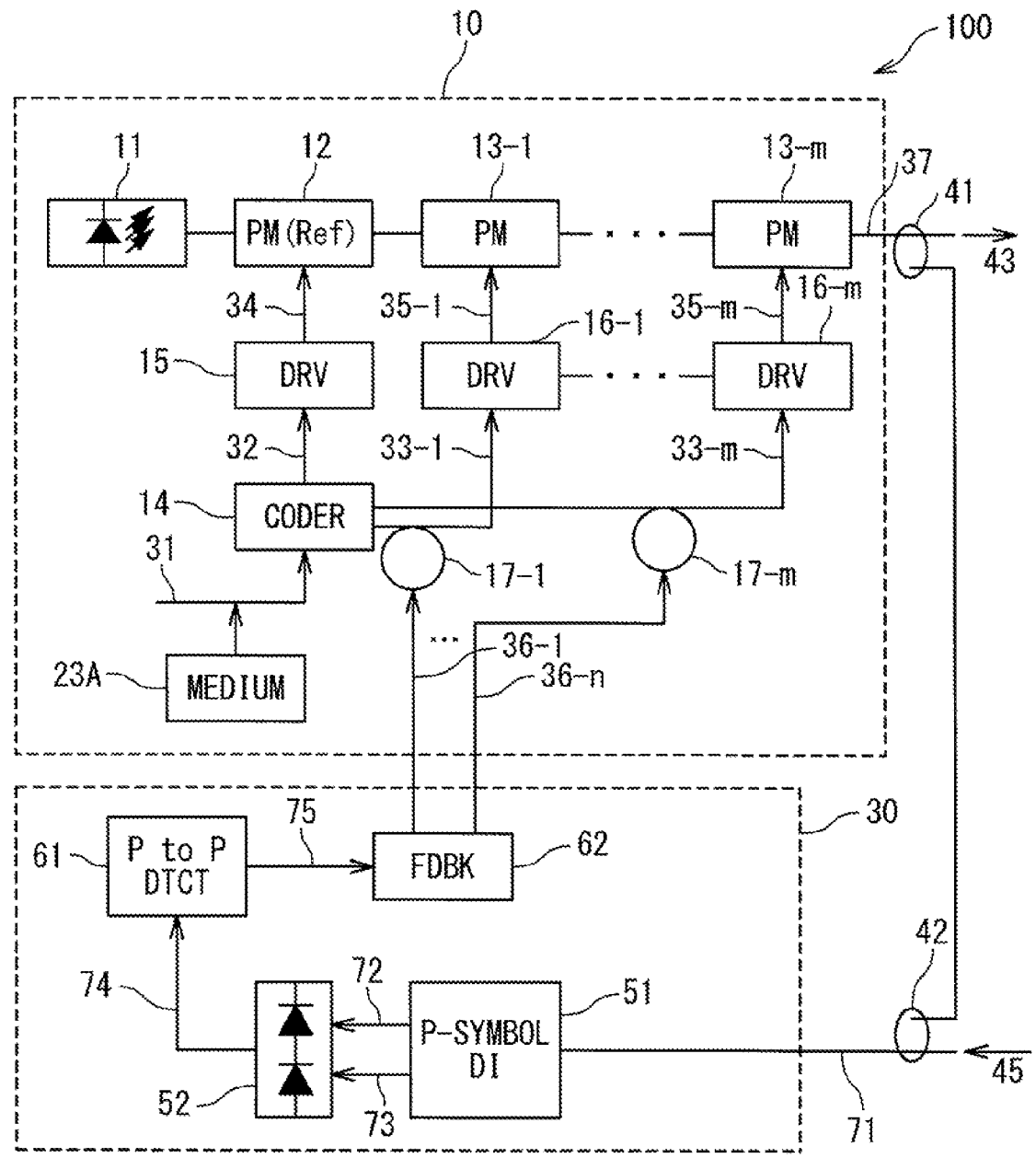
FIG. 4A is a schematic representation of another exemplary configuration of a serial DxPSK transmitter according to the present invention.

In one exemplary embodiment, as shown in FIG. 4A, the specific pattern may be already generated and stored on a medium 23A in order to be used when the timing is set. In setting the timing of phase modulation performed by the target phase modulator **13-*z*, the medium 23A feeds the specific pattern to the coder 14**.

Figure 4B:
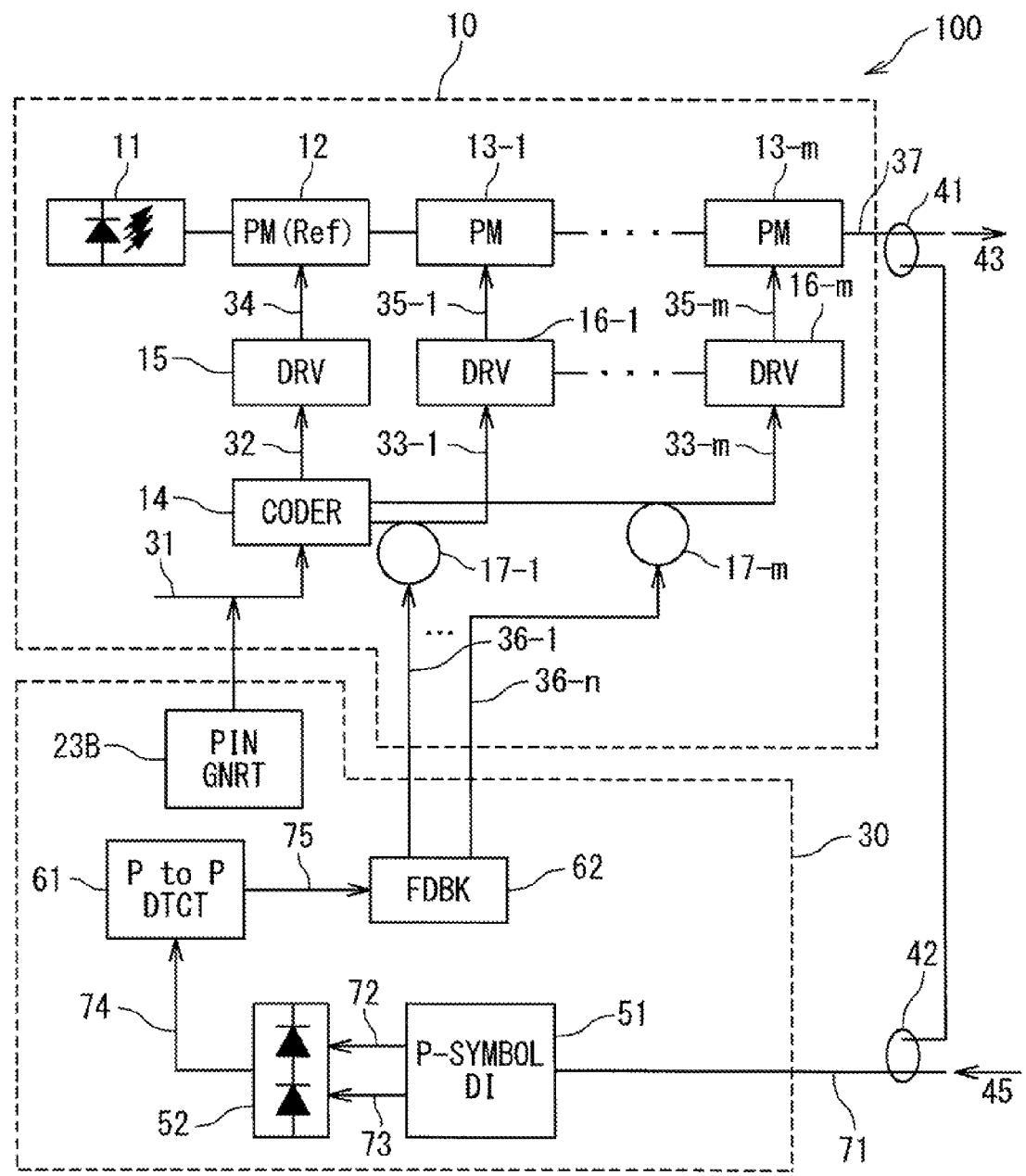
FIG. 4B is a schematic representation of still another exemplary configuration of a serial DxPSK transmitter according to the present invention.

Alternatively, as shown in FIG. 4B, a pattern generator 23B storing the specific pattern is provided within the control system 30 in order to be used when the timing is set. In setting the timing of phase modulation performed by the target phase modulator **13-*z*, the pattern generator 23B feed the specific pattern to the coder 14**.

Figure 5:
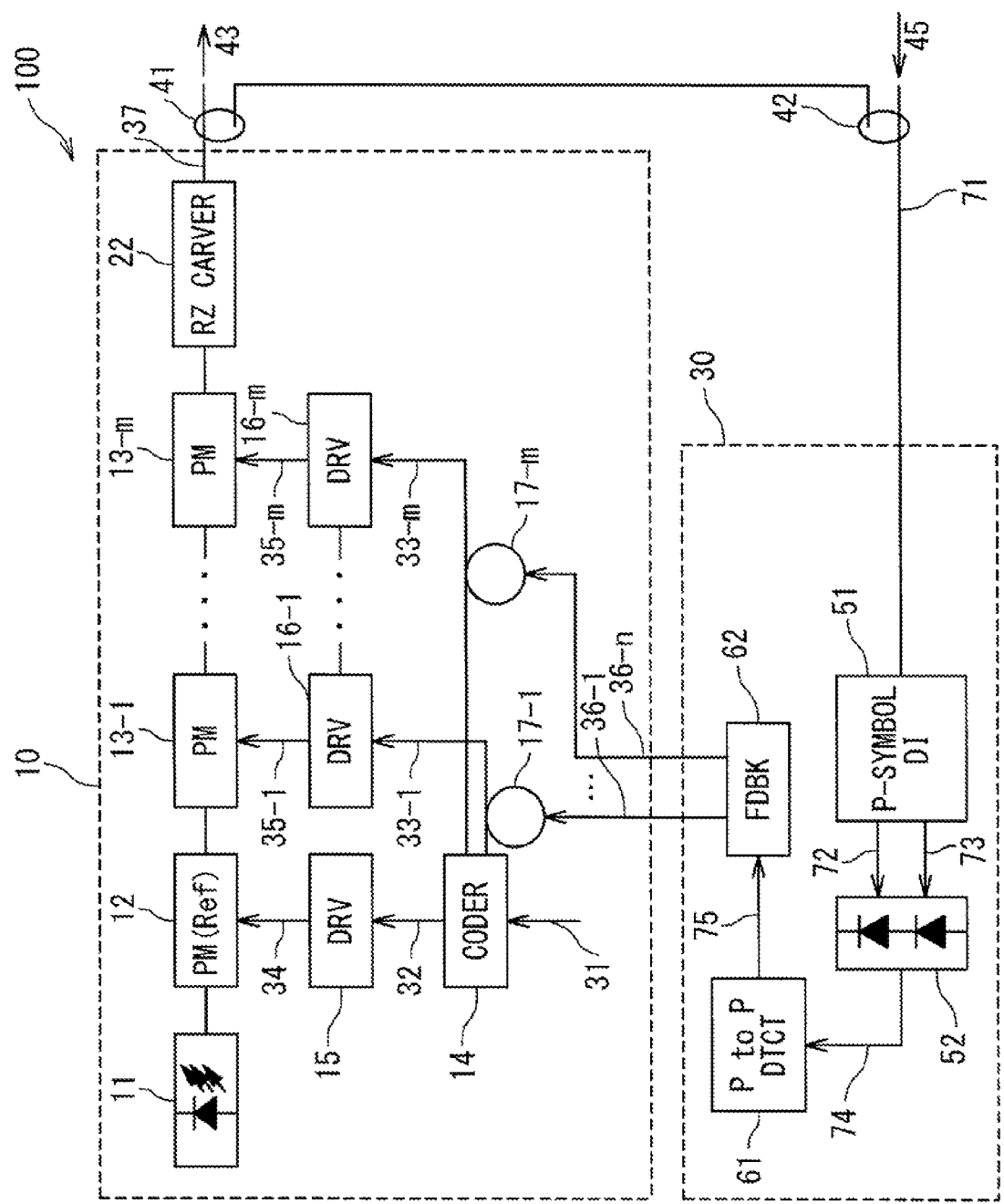
FIG. 5 is a schematic representation of still another exemplary configuration of a serial DxPSK transmitter according to the present invention.

In one exemplary embodiment, the sub-module 10 or 20 may additionally include a RZ (return to zero) carver 22 to provide RZ carving for the output light signal 37 so that the output light signal 37 is generated in accordance with the RZ format, as shown in FIG. 5. In this case, the RZ carver 22 of the sub-module 10 (or 20) is preferably turned off during the setting in order to increase the sensitivity of the detection of the peak-to-peak characteristics.

In another exemplary embodiment, the peak-to-peak detection may be sampled synchronously to the timing of the m phase modulators in order to detect the peak-to-peak characteristics when the m phase modulators other than the target phase modulator **13-*z*** imprint the phase corresponding to the specific pattern and reduce the effect of chirp of the m phase modulators, enhancing the sensitivity of the detection of the peak-to-peak characteristics.

In still another exemplary embodiment, the specific pattern may be generated at a bit rate different from the bit rate used for the transmission of data during the normal operation of the transmitter 100. In that case, the delay interferometer 51 has a delay of P symbols at the baud rate of the light signal emitted when the specific pattern is used.

More specifically, the specific pattern may be generated at a baud rate f' so that f'=f/q, where f is the nominal baud rate of the transmitter 100 and q is real number strictly higher than 1. The delay interferometer 51 is chosen so that the delay of the longer arm is P symbols at the baud rate f'. According to the first condition on the specific pattern, this allows to reduce the necessary number of bits of the specific pattern for a given tuning range by reducing the bit rate of the specific pattern: In other words, when there are limitations on the specific pattern, reducing the baud rate of the pattern allows setting the timing on wider ranges.

In still another embodiment, the set of states of the phase $\Theta_{MAX}$ defined in the conditions on the specific pattern is chosen to have the zero radian phase as one of its two elements. In that case, the specific pattern may be generated at a baud rate f' such as f'=f/D, where f is the nominal baud rate of the transmitter 100 and D is natural number strictly higher than 1. The delay interferometer 51 is chosen so that the delay of the longer arm is chosen as P symbol periods at the transmitter nominal baud rate. Consequently, the specific pattern of A' symbols at the baud rate f' is equivalent to series of A' sequences of D identical symbols at the baud rate f after passing through the delay interferometer 51. Both equivalent specific patterns of the bit rates f and f' satisfy all the conditions of the specific pattern definitions. As a consequence, according to the first condition on the specific pattern, this allows to reduce the necessary number of bits of the specific pattern for a given tuning range by reducing the bit rate of the specific pattern. In other words, when there are limitations on the specific pattern, reducing the baud rate of the specific pattern allows setting the timing on wider ranges.

In still another exemplary embodiment, the search of the minimum value of the peak-to-peak characteristics may be performed: first by a scan on the range of timing of the phase modulation performed by the phase modulator with a step smaller or equal to one symbol period; then, by adjusting the timing in order to reduce the peak-to-peak characteristics.

For the parallel xPSK modulator 29, the above-described setting procedure may be applied recursively to phase modulation performed by R phase modulators of the parallel phase modulators 13-1 to **13-*m* of the transmitter 100 modulating the phase consecutively to the reference phase modulator 12**.

For the first iteration, only the reference phase modulator 12 is considered as being part of the m phase modulators with a set timing. The target phase modulator, for which the timing of the phase modulation is to be set, is the phase modulator 13-1. In the following iterations, the m phase modulators, for which the timing of modulation has been set, include all the phase modulators of the previous iterations and the phase modulator, for which the modulation timing was set in the previous iteration. The target phase modulator, for which the timing of phase modulation is set by the current iteration, is the phase modulator consecutive to the phase modulator or arm, for which the modulation timing has been set in the previous iteration.

In one exemplary embodiment, the high order xPSK transmitter 100 may be configured so that the wavelength is tunable. In this embodiment, the laser 11 is a tunable laser. In this case, the timing of phase modulation is set during the wavelength switching sequence of the transmitter 100.

Figure 6:
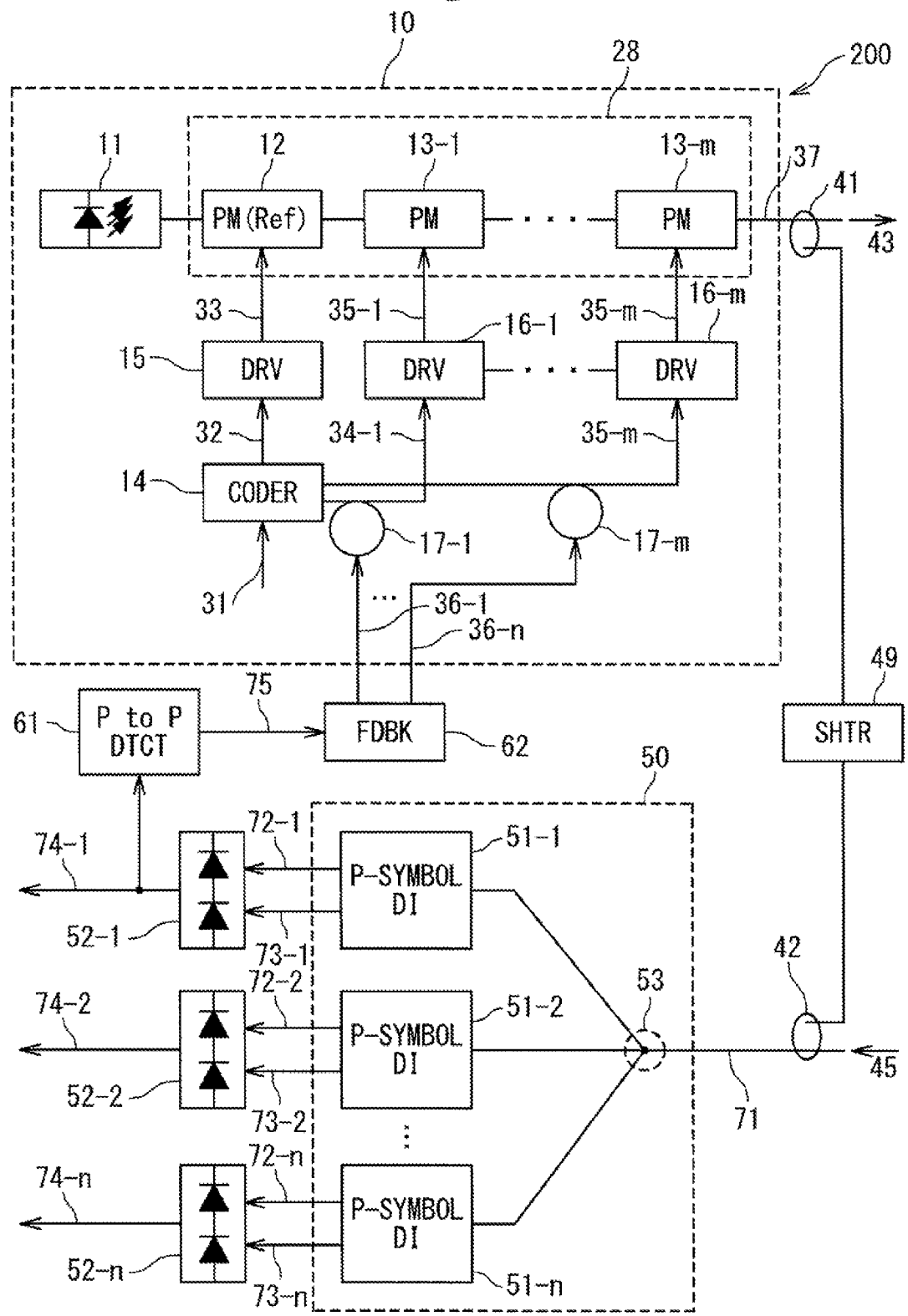
FIG. 6 is a schematic representation of an exemplary configuration of a transponder incorporating a serial DxPSK transmitter and a DxPSK receiver according to the present invention.

In another exemplary embodiment of the present invention, as shown in FIG. 6, the present invention may be implemented as a transponder 200 which includes a $2^n$ order serial DxPSK transmitter 10 and a demodulator 50, where the natural number n is strictly higher than 2. The demodulator 50 is based on n P-symbol delay interferometers 51-1 to 51-$n$. The demodulator 50 incorporates a divider 53 which distributes the input light signal 71 to the P-symbol delay interferometers 51-1 to 51-$n$. The delay interferometers 51-1 to 51-$n$ are connected to balanced photo-detectors 52-1 to 52-$n$, respectively. The balanced photo-detector 52-1 converts light signals 72-1 to 73-1 into an electrical signal 74-1. Correspondingly, the balanced photo-detector 52-$i$ converts light signals 72-$i$ to 73-$i$ into an electrical signal 74-$i$, where i is a natural number equal to or less than m. One delay interferometer 51-1 in the demodulator 50 is used to monitor the output light signal 37 emitted by the modulator 10. The peak-to-peak voltage of the electrical signal 74-1 resulting from the light signals 72-1 and 73-1 emitted from the delay interferometer 51-1 is monitored by the peak-to-peak detection circuit 61.

In normal operation, the demodulator 50 receives an external light signal 45 through the coupler 42 to retrieve data from the external light signal 45. The shutter 49 is set off so that no light emitted by the transmitter 10 is received by the demodulator 50.

In setting the timing of the $z^{th}$ phase modulator 13-$z$, a portion of the light signal 37 is fed to the demodulator 50 through the divider 41 and the coupler 42. The shutter is set on.

Alternatively, the coupler 41 may be replaced by a switch directing the light to the medium during normal operation and to the demodulator 50 during the setting of the timing of phase modulation. In that case, the shutter 49 may be removed.

In addition, in setting the timing of phase modulation, a specific pattern defined accordingly to the above-described conditions is fed to the coder 14 of the transmitter 10, where n is fixed by the modulation format and h is fixed by the $z^{th}$ phase modulators 13-$z$. Furthermore, P, φ1, and φ2 are chosen accordingly to the delay interferometer 51. In one embodiment, φ1 and φ2 are chosen as φ1=φ0+π/h, and φ2=φ0−π/h, where φ0 is the adjustment phase of the phase adjustment section 83 on the shorter arm of the delay interferometer 51-1. The light signals 72-1 and 73-1 emitted by the delay interferometer 51-1 are converted into the electrical signal 74-1 by the balanced photo-detector 52-1. The peak-to-peak detection circuit 61 detects the peak-to-peak voltage of the electrical signal 74-1. The timing of the phase modulation performed by the $z^{th}$ phase modulator 13-$z$ is set to minimize the peak-to-peak voltage of the electrical signal 74-1.

Examples of demodulators based on combinations of one symbol delay interferometers are given for DxPSK of order 8 (D8PSK), in Y. Han et al., "Simplified receiver implementation for optical differential 8-level phase-shift keying", Electronics Letters, Vol. 14, No. 21 (October 2004), and for DxPSK of order 16 in R. Sambaraju et al., "16-level differential phase shift keying (D16PSK) in direct detection optical communication systems", Optics Express, Vol. 14, No. 22, pp. 10239-10244 (October 2006).

Figure 7:
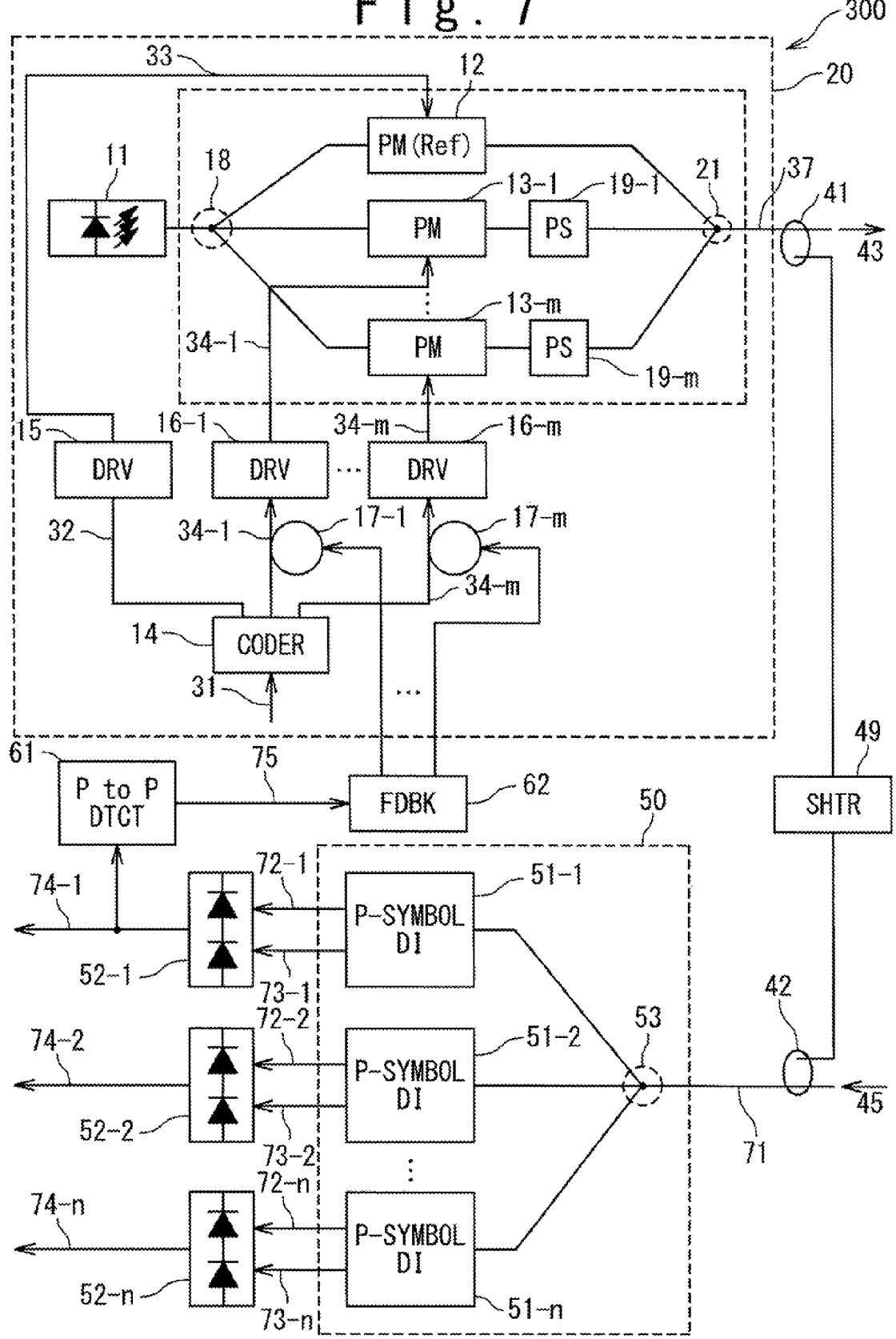
FIG. 7 is a schematic representation of an exemplary configuration of a transponder incorporating a parallel DxPSK transmitter and a DxPSK receiver according to the present invention.

In another exemplary embodiment of the present invention, as shown in FIG. 7, the present invention may be implemented as a transponder 300 which includes a $2^n$ order parallel DxPSK transmitter 20 instead of the serial DxPSK transmitter 10, where the natural number n is strictly higher than 2. The parallel modulator DxPSK has (m+1) parallel arms, each one having a single phase modulator shifting the phase of the optical carrier by 0 or π radians when it is driven with a voltage according to the binary data pattern 31. The parallel arms other than the reference arm have additional phase shifters 19-1 to 19-$m$, respectively. The additional phase shifters 19-$i$ shifts the phase of the optical carrier by πi/(m+1) radians, where i is any natural number equal or more than 1 and equal to or less than m. The demodulator 50 within the transponder 200 is based on n P-symbol delay interferometers 51-1 to 51-$n$, as is the case of the transponder 200 shown in FIG. 6. The delay interferometers 51-1 to 51-$n$ are connected to the photo-detectors 52-1 to 52-$n$ to convert the light signals 72-1 to 72-$n$ and 73-1 to 73-$n$ into the electrical signal 74-1 to 74-$n$. One interferometer 51-1 monitors the peak-to-peak voltage of the electrical signal 74-1 resulting from the light signals 72-1 and 73-1. The peak-to-peak voltage is monitored by the peak-to-peak detection circuit 61.

In setting the timing of a target phase modulator 13-$z$, the specific pattern, defined as the above-described conditions, is fed to the coder 31. where n is fixed by the modulation format and h is chosen as h=4. In addition, P, φ1 and φ2 are chosen accordingly the delay interferometer 51-1. In one embodiment, φ1 and φ2 are chosen as φ1=φ0+π/h, and φ2=φ0−π/h, where φ0 is the adjustment phase of the phase adjustment section 83 on the shorter arm of the delay interferometer 51-1. The light signals 72-1 and 73-1 emitted from the delay interferometer 51-1 are converted into the electrical signal 74-1 by the balanced photo-detector 52-1. The peak-to-peak detection circuit 61 detects the peak-to-peak voltage of the electrical signal 74-1. The timing of the phase modulation performed by the phase modulator 13-$z$ is set to minimize the peak-to-peak voltage of the electrical signal 74-1.

Alternatively, the shutter 49 may be removed if the coupler 41 is replaced by a switch.

In another exemplary embodiment, the timing of phase modulation of a serial DQPSK transmitter is set. The serial transmitter has two phase modulators: one modulator shifts the phase of the optical carrier by 0 or π radians; the other modulator shifts the phase of the carrier by 0 or π/2 radians. The order of the modulators is not mandatory but the timing of the modulation performed by the second phase modulator is set.

Figure 8:
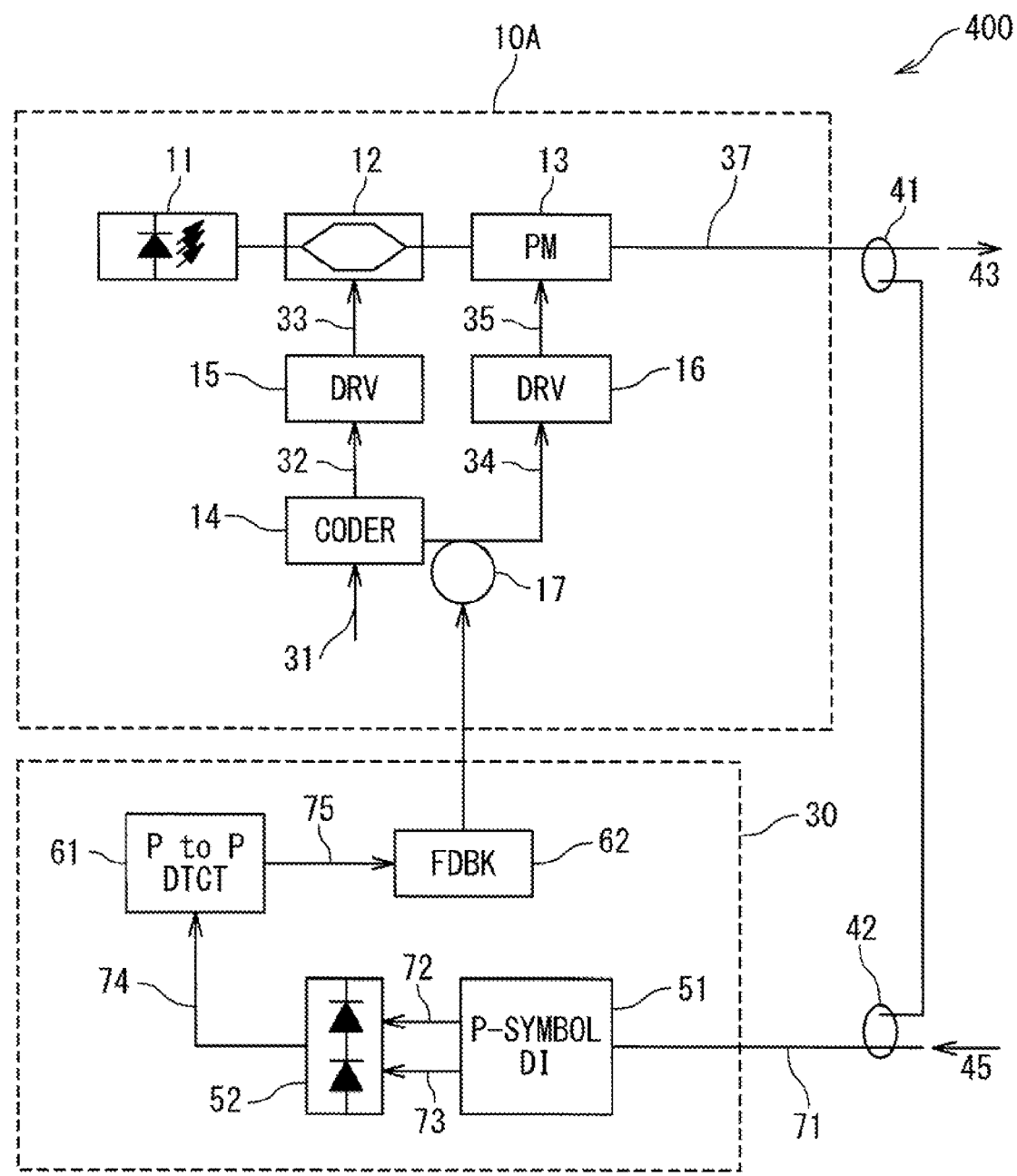
FIG. 8 is a schematic representation of an exemplary configuration of a serial DQPSK transmitter according to the present invention.

More specifically, as shown in FIG. 8, a serial DQPSK transmitter 400 includes a sub-module 10A and a control system 30. The sub-module 10A includes a laser 11, two consecutive phase modulators 12 and 13, a coder 14, drivers 15, 16 and a tunable phase shifter 17. The control system includes a P-symbol delay interferometer 51, a balanced photo-detector 52, a peak-to-peak detection circuit 61 and a feedback circuit 62.

The laser 11 emits continuous light at a wavelength used for optical communications. The information of the binary data pattern 31 transmitted electrically to the coder 14 is imprinted as phase information on the optical carrier emitted by the laser 11 by the two consecutive phase modulators 12 and 13. The phase modulator 12 is a Mach-Zehnder modulator, driven by the driver 15 to change to phase of the optical carrier by 0 or $\pi$ radians. The phase modulator 13 is driven by the driver 16 to change the phase of the optical carrier by 0 or $\pi/2$ radians. A light signal 37 containing the information is emitted from the output port of the serial DQPSK modulator 10. For each symbol within the optical signal 37, the data is encoded as phase difference with the previous symbol. The phase difference may have four values: 0, $\pi/2$, $\pi$, or $3\pi/2$ in radians. Therefore, two consecutive bits of the binary data pattern 31 fed to the serial DQPSK modulator 10 are mapped on each symbol within the light signal 37 emitted from the serial DQPSK modulator 10. The coder 14 transforms two bits of the binary data pattern 31 into two electrical information signals sent to the drivers 15 and 16 through respective electrical paths 32 and 33. The phase modulators 12 and 13 imprint the phase of a symbol on the optical carrier, so that the phase difference with the previous symbol maps the information of the two binary bits. The drivers 15 and 16 transform the electrical voltages from the coder 14 into voltages passing through respective electrical, paths 33 and 35. The values of the voltages are determined so that respective phase modulators 12 and 13 imprint the correct phase to said symbol.

The tunable phase shifter 17 is placed on the path 34 of the electronic signal between the coder 14 and the phase modulator 13, for which the timing of the phase modulation is set. The tunable phase shifter 17 may be based on mechanical tuning, voltage tuning or electro-mechanical tuning.

A portion of the light signal 37 emitted by the sub-module 10A is tapped or branched by a divider 41. The portion of light signal 37 is coupled by a coupler 42 in the input port of the P symbol delay interferometer 51. Both constructive and destructive outputs of the delay interferometer 51 are connected to the balanced photo-detector 52 to convert light signals 72 and 73 from the output ports of the delay interferometer 51 into an electrical signal 74. The peak-to-peak detection circuit 61 detects the peak-to-peak voltage of the electrical signal 74 generated by the balanced photo-detector 52. The feedback circuit 62 tunes the tunable phase shifter 17 in order to minimize the peak-to-peak voltage detected by the peak-to-peak detection circuit 61 when a periodic repetition of the specific pattern is fed to the coder 14.

A light signal 43 may be used to transmit a signal when the corresponding binary data pattern 31 is fed to the coder 14. The sub-module 10A, the divider 41, the coupler 42 and the control system 30 may be integrated within the transmitter 400.

Alternatively, the sub-module 10A may be an independent serial DQPSK transmitter and the system 30 a separate mean to set the timing of phase modulation in 10A.

In setting the timing of the timing of phase modulation of a serial DQPSK transmitter 400, a specific pattern defined accordingly to the above-described conditions is fed to the coder 14. The light signal 37 emitted by the serial DQPSK modulator 10 is partially branched to the input port of the P-symbol delay interferometer 51, where P is defined in the pattern conditions. The shorter arm of the delay interferometer 51 has an additional phase shift of $(\phi 1+\phi 2\phi 2\pi/h)/2$ radians modulo $\pi$, where $\phi 1$ and $\phi 2$ are defined in the pattern conditions.

In the configuration shown in FIG. 8, the phase modulator 13, which shifts the phase of the optical carrier by 0 or $\pi/2$, is selected as the target phase modulator, for which the timing of the phase modulation is set. In this case, h is by definition equal to 4. In an alternative exemplary embodiment, the phase modulator 12, which shifts the phase of the optical carrier by 0 or $\pi$, may be selected as the target phase modulator. In this case, h is by definition equal to 2. In addition, the tunable phase shifter 17 is placed on the path 32 between the coder 14 and the driver 15 in place of the path 34.

The light signals 72 and 73 emitted by the delay interferometer 51 is converted into the electrical signal 74 by the balanced photo-detector 52. The peak-to-peak detection circuit 61 detects the peak-to-peak voltage of the electrical signal 74. The timing of the phase modulation performed by the phase modulator 13 (or the phase modulator 12) is set to minimize the peak-to-peak signal.

Figure 9:
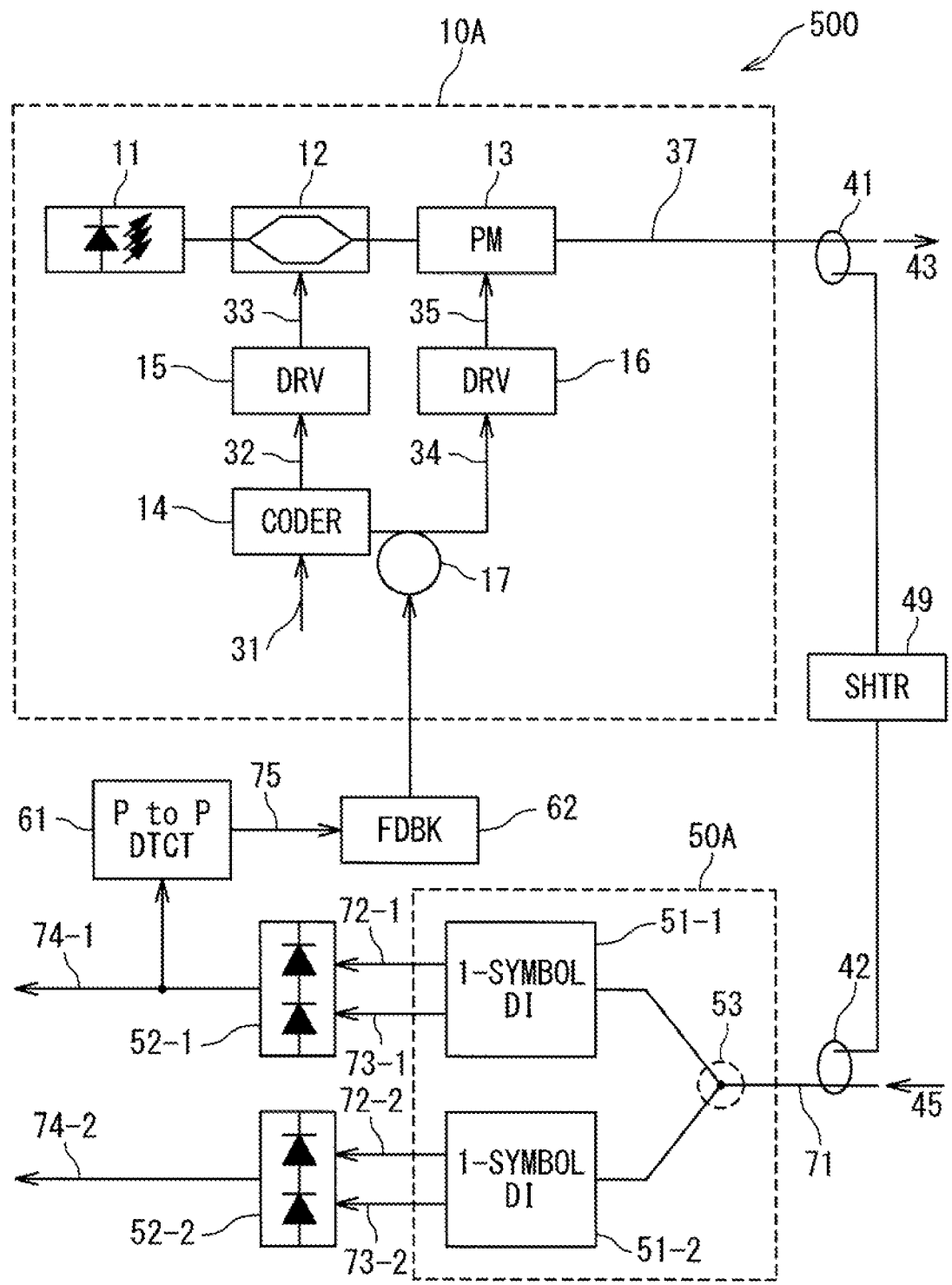
FIG. 9 is a schematic representation of an exemplary configuration of a transponder incorporating a serial DQPSK transmitter and a DQPSK receiver according to the present invention.

In another exemplary embodiment, the timing of phase modulation of a serial DQPSK transmitter within a transponder is set. As shown in FIG. 9, the transponder, denoted by the numeral 500, has a demodulator 50A based on two one-symbol delay interferometers 51-1 and 51-2 in addition to the serial DQPSK transmitter 10A. The delay interferometers 51-1 and 51-2 are connected to the balanced photo-detectors 52-1 and 52-2. The balanced photo-detector 52-1 converts light signals 72-1 and 73-1 emitted by the delay interferometers 51-1 into an electrical signal 74-1. Correspondingly, the balanced photo-detector 52-2 converts light signals 72-2 and 73-2 emitted by the delay interferometers 51-2 into an electrical signal 74-2. The demodulator 50A demodulates an input light signal 71 and the corresponding electrical signals 74-1 and 74-1 can be used as received electrical data. The demodulator 50A, and the balanced photodiodes 52-1 and 52-2 may be integrated on a receiver sub-module, being part of the same transponder as the transmitter. During the normal operation of the transponder 400, data are fed to the coder 14, and divider 41 and the feedback circuit 62 are disabled.

One delay interferometer 51-1 in the demodulator 50A is used to monitor the output light signal 37 emitted by the serial transmitter 10A. The peak-to-peak voltage of the electrical signal 74-1 resulting from the light signals 72-1 and 73-1 emitted from the delay interferometer 51-1 is monitored by the peak-to-peak detection circuit 61.

In the configuration of the transponder 500 shown in FIG. 9 the timing of the phase modulation performed by the phase modulator 13 is set. A specific pattern is chosen accordingly to the above-described conditions, where n=2, h=4. In addition, P is fixed to P=1 from the condition on the demodulator 50A of the transponder 500. Moreover, $\phi 1$ and $\phi 2$ are chosen accordingly to the arm delays of the delay interferometer 51-1. A periodic repetition of the specific pattern is applied to the serial transmitter 10A. The light signal 37 emitted by the modulator 10A is partially branched to the input port of the delay interferometer 51-1. The light signals emitted by the delay interferometer 51-1 are converted into the electrical signal 74-1 by the balanced photo-detector 52-1. The peak-to-peak detection circuit 61 detects the peak-to-peak voltage of the electrical signal 74-1. The timing of the phase modulation performed by the phase modulator 13 is set to minimize the peak-to-peak voltage of the electrical signal 74-1.

Figure 10:
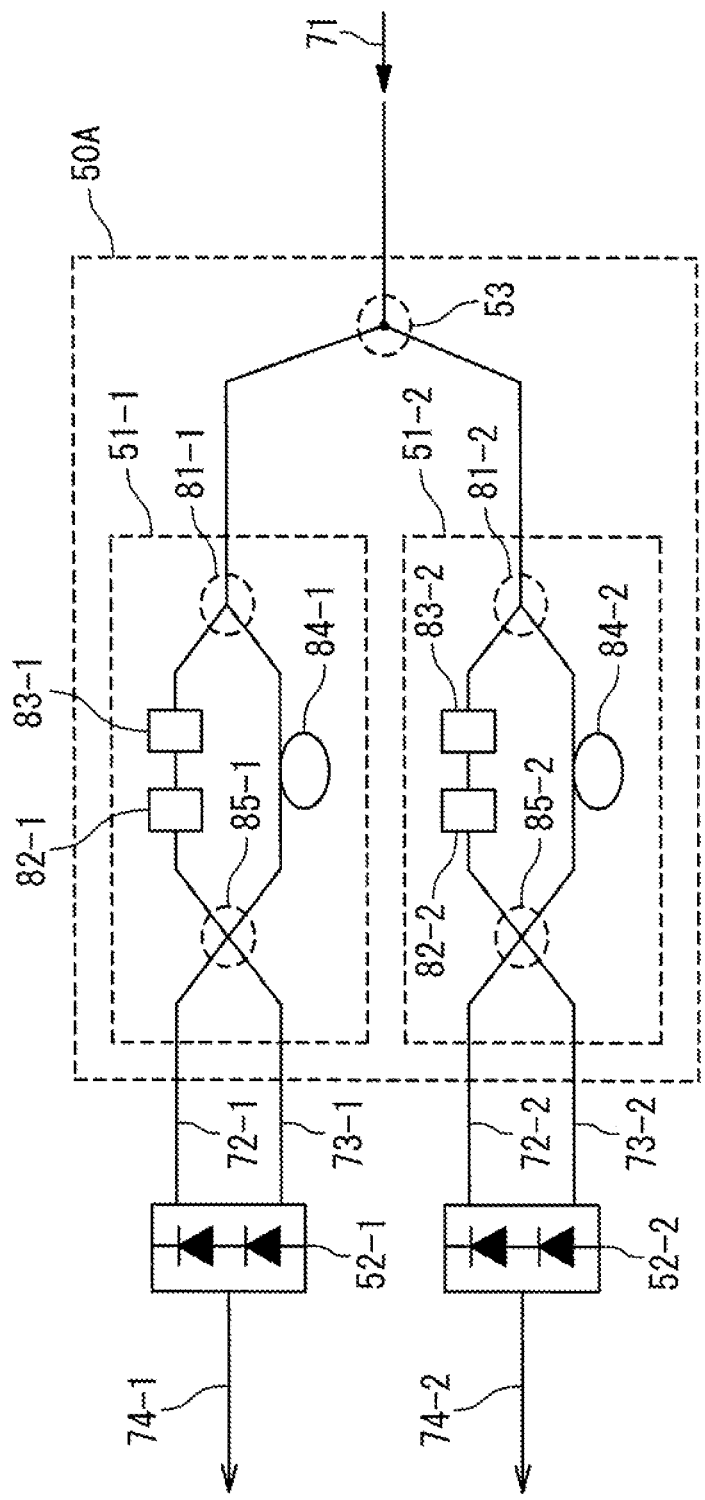
FIG. 10 is a schematic representation of an exemplary configuration of a DQPSK demodulator based on two one-symbol delay interferometers connected to two pairs of balanced photo-detectors.

FIG. 10 is a schematic representation of an exemplary configuration of the DQPSK demodulator 50A based on two one-symbol delay interferometers 51-1 and 51-2. Such a device is widely used. The demodulator 50A consists of two arms, an in-phase (I) arm and a quadrature phase (Q) arm. The received light signal 71 is distributed to each arm by a beam splitter 53. Each arm consists of two optical paths between a beam splitter, denoted by the numerals 81-1 and 81-2, respectively and a directional coupler, denoted by the numerals 85-1 and 85-2, respectively. The first path of each arm comprises a one-symbol delay section, denoted by the numerals 84-1 and 74-2, respectively. The second path of each arm includes adjustable delay sections: tuning sections 82-1 and 82-2 which independently tune the respective arms to the wavelength of the received light signal 71; and phase adjustment sections 83-1 and 83-2. For the DQPSK modulator 10A, phase adjustment sections 83-1 and 83-2 can be set to π/4 and −π/4, respectively. The light signals 72-1 and 73-1 are emitted from constructive and destructive outputs of the I arm, respectively which can be connected to the balanced photo-detector 52-1 to receive the I tributary of the light signal 71 demodulated by the demodulator 400. Identically, the light signals 72-2 and 73-2 are emitted from constructive and destructive outputs of the Q arm, respectively. The Q tributary of the light signal 71 demodulated by the demodulator 50A can also be received at the balanced photo-detector 52-2.

In another exemplary embodiment, the timing of phase modulation of a parallel DQPSK transmitter is set. The parallel modulator has two arms, each one having a single modulator shifting the phase of the optical carrier by 0 or π radians when it is driven with a voltage according to a binary pattern. Both one of the arms has an additional π/2 radian shift.

Figure 11:
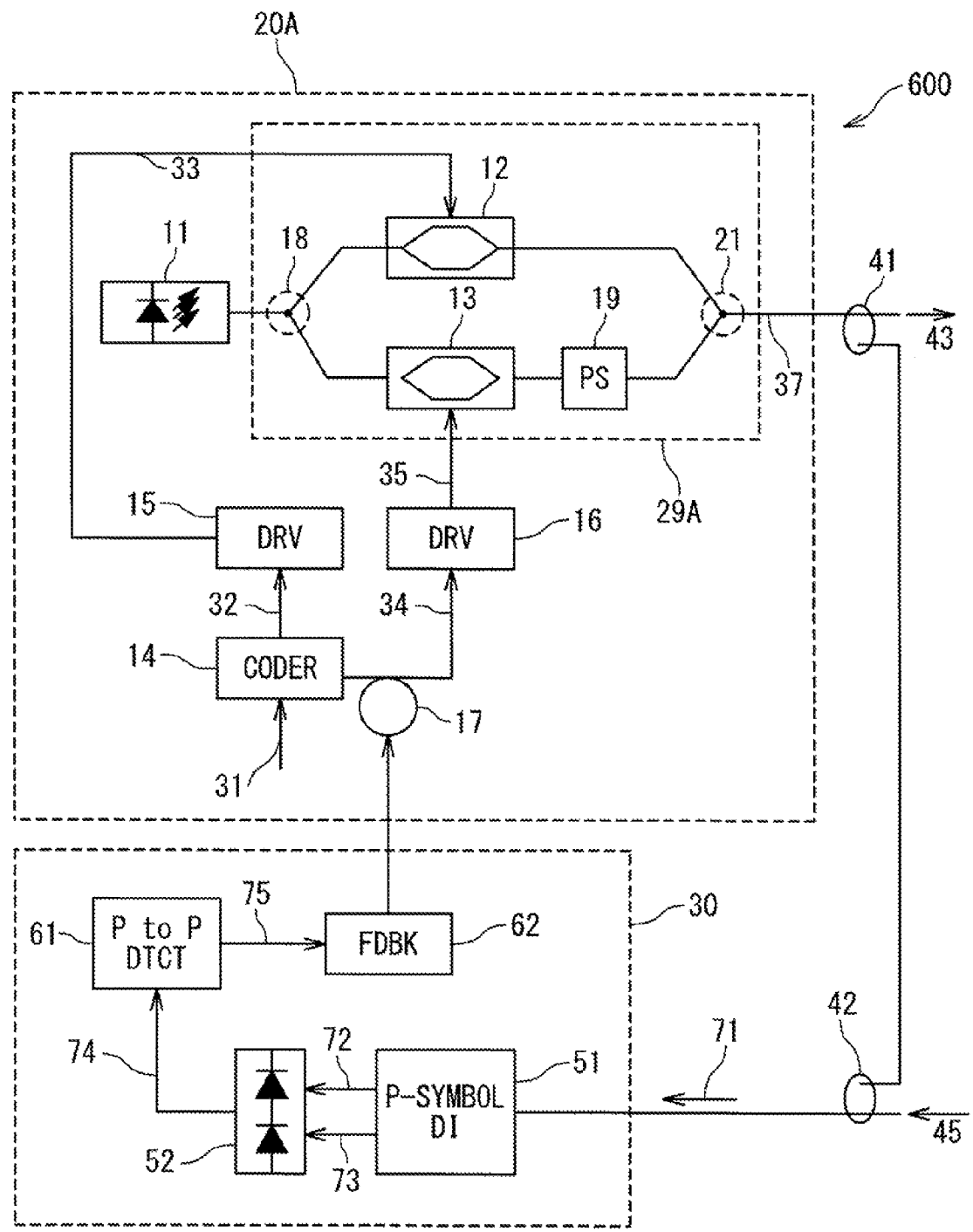
FIG. 11 is a schematic representation of an exemplary configuration of a parallel DQPSK transmitter according to the present invention.

More specifically, as shown in FIG. 11, the parallel DQPSK transmitter, denoted by the numeral 600, includes a parallel DQPSK modulator 29A which is connected to the control system 30.

The sub-module 20A is provided with a laser 11, two nested Mach-Zehnder modulators 12 and 13, a coder 14, drivers 15 and 16 and tunable phase shifter 17.

The laser 11 emits continuous light at a wavelength used for optical communications. The information of a binary data pattern 31 transmitted electrically to the coder 14 is imprinted as phase information on the optical carrier emitted by the sub-module 20A by the two Mach-Zehnder modulators 12 and 13 nested on two parallel arms of the parallel modulator. The light signal emitted by the laser 11 is distributed to the two arms by a beam splitter 18. The arm containing the modulator 13 has an additional phase shifting section 19, such as an additional length, to shift the phase of the light carrier in this arm by π/2 in reference to the other arm. The light carriers of both arms are recombined by a directional coupler 21 and are emitted from the output port of the parallel modulator 29A. The modulator 12 is driven by the driver 15 to change to phase of the optical carrier by 0 or π radians. The modulator 13 is driven by the driver 16 to change to phase of the optical carrier by 0 or π radians. The light signal 37 containing the information is emitted from the parallel modulator 29A. For each symbol in the light signal 37, the data is encoded as phase difference with the previous symbol. The phase difference can have four values: 0, π/2, π, and 3π/2 in radians. Therefore, two consecutive bits of the binary data pattern 31 fed to the coder 14 are mapped on each symbol in the light signal 37. The coder 14 transforms two bits of the binary information of the binary data pattern 31 into two electrical information signals sent to the drivers 15 and 16 through the respective electrical paths 32 and 34. The phase modulators 12 and 13 imprint the phase of a symbol on the optical carrier, so that the phase difference with the previous symbol maps the information of the two binary bits. The drivers 15 and 16 transform the electrical voltages from the coder 14 into drive voltages passing through respective electrical paths 33 and 35. The levels of the drive voltages are determined so that the respective phase modulators 12 and 13 imprint the correct phase to the symbol.

The tunable phase shifter 17 is placed on the path 34 of the electronic signal between the coder 14 and the Mach-Zehnder modulator 13, placed on the arm, for which the timing of modulation is set. The tunable phase shifter 17 may be based on mechanical tuning, voltage tuning or electro-mechanical tuning. A portion of the light signal 37 emitted from the parallel modulator 29A is tapped or branched by the divider 41. The portion of the light signal 37 is coupled by the coupler 42 in the input port of the P-symbol delay interferometer 51. Both constructive and destructive outputs of the delay interferometer 51 are connected to the balanced photo-detector 52 to convert the light signals 72 and 73 from the output ports of the delay interferometer 51 into the electrical signal 74. The peak-to-peak detection circuit 61 detects the peak-to-peak voltage of the electrical signal 64. The feedback circuit 62 tunes the tunable phase shifter 17 in order to minimize the peak-to-peak voltage detected by the peak-to-peak detection circuit 61 when a periodic repetition of the specific pattern is fed to the coder 14. The light signal 43 can be used to transmit a signal when the corresponding binary data pattern 31 is fed to the coder 14.

The sub-module 20A, the divider 41; the coupler 42, and the control system 30 may be integrated on the transmitter 600.

Alternatively, the sub-module 20A may be an independent parallel DQPSK transmitter, and the system 30 as well as the divider 41 and the coupler 42 can be external means to set the timing of modulation of the parallel DQPSK transmitter 20A.

In setting the timing of the phase modulation of the phase modulator 13, a periodic repetition of the specific pattern defined as the above-described conditions is fed to the coder 14 of the sub-module 20A. The light signal 37 emitted by the sub-module 20A is partially branched to the input port of the P-symbol delay interferometer 51, where P is defined in the pattern conditions. The shorter arm of the delay interferometer 51 has an additional phase shift of $(\phi_1+\phi_2 2\pi/h)/2$ radians modulo π, where π1 and π2 are defined in the pattern conditions. The light signals 72 and 73 emitted at the outputs of the delay interferometer 51 are converted into the electrical signal 74 by the balanced photo-detector 52. The peak-to-peak detection circuit 61 detects the peak-to-peak voltage of the electrical signal 74. The timing of the phase modulation performed by the phase modulator 13 is set to minimize the peak-to-peak voltage.

In the configuration shown in FIG. 11, the phase modulator 13 is selected as the target phase modulator, for which the timing of the phase modulation is set. In an alternative exemplary embodiment, the phase modulator 12 may be selected as the target phase modulator instead. In this case, the tunable phase shifter 17 is placed on the path 32 between the coder 14 and the driver 15 in place of the path 34.

Figure 12:
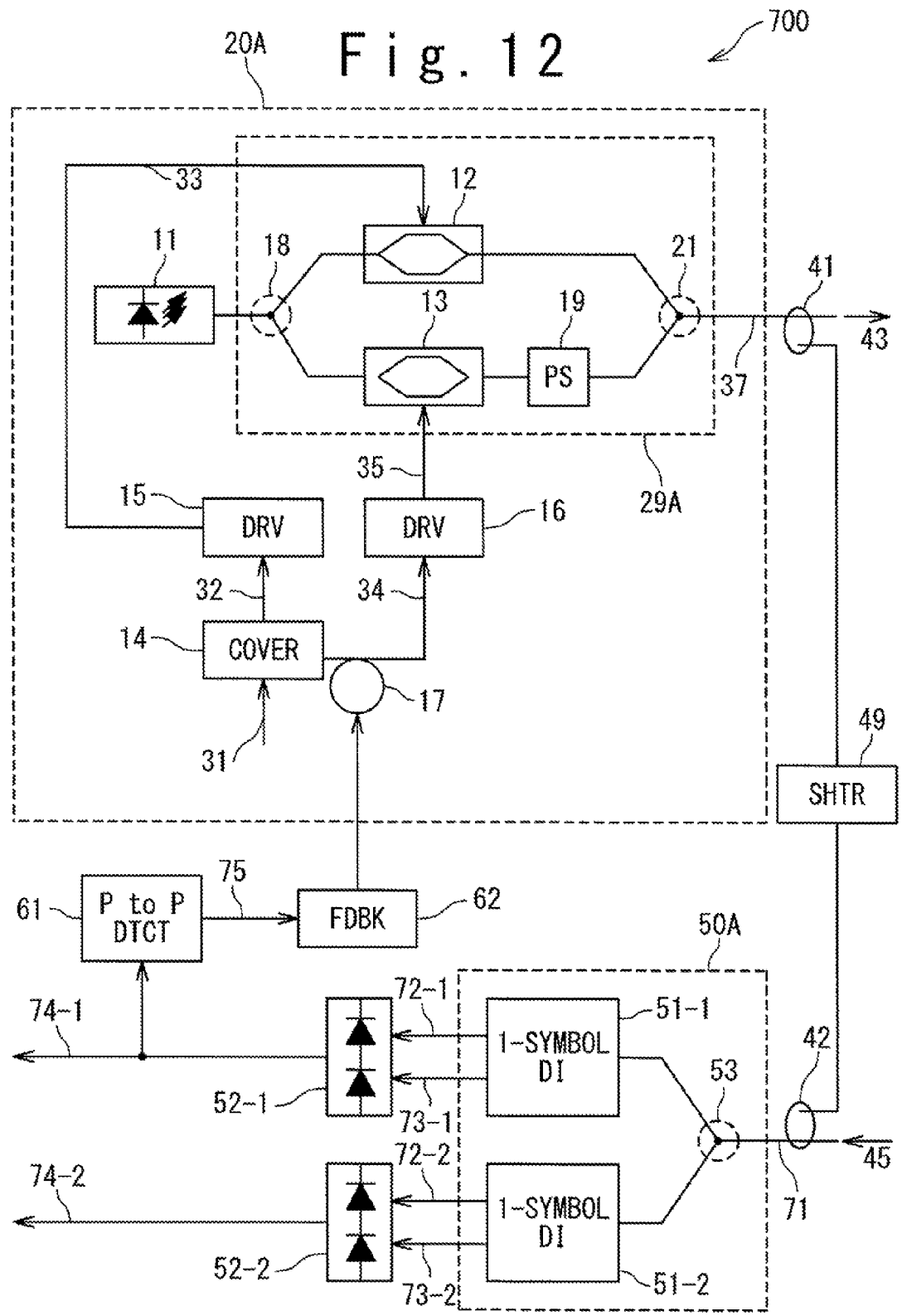
FIG. 12 is a schematic representation of an exemplary configuration of a transponder incorporating a parallel DQPSK transmitter and a DQPSK receiver according to the present invention.

In another exemplary embodiment, the timing of phase modulation of a parallel DQPSK transmitter within a transponder is set. As shown in FIG. 12, the transponder, denoted by the numeral 700, is provided with the parallel DQPSK transmitter 20A shown in FIG. 11 and the demodulator 50A shown in FIG. 9.

The demodulator 50A may be integrated on a receiver sub-module, being part of the same transponder as the transmitter. During the normal operation of the transponder 700, data are fed to the coder 14, and divider 41 and the feedback circuit 62 are disabled.

One delay interferometer 51-1 in the demodulator 50A is used to monitor the output light signal 37 emitted by the parallel transmitter 20A. The peak-to-peak voltage of the electrical signal 74-1 resulting from the light signals 72-1 and 73-1 emitted at the outputs of the delay interferometer 51-1 are monitored by the peak-to-peak detection circuit 61.

In setting the timing of the phase modulation of the phase modulator 13, a periodic repetition of the specific pattern defined as the above-described conditions is fed to the coder 14 of the modulator 20A, where n=2, h=4. In addition, P is fixed to P=1 from the conditions on the demodulator 50A of the transponder 700. Moreover, φ1 and φ2 are chosen accordingly to the arm delays of the delay interferometer.

The light signal emitted by the transmitter 20A is partially branched to the input port of the delay interferometer 51-1. The light signals 72-1 and 73-1 emitted from the delay interferometer 51-1 are converted into the electrical signal 74 by the photo-detector 52-1. The peak-to-peak detection circuit 61 detects the peak-to-peak voltage of the electrical signal 74. The timing of the phase modulation performed by the phase modulator 13 is set to minimize the peak-to-peak voltage of the electrical signal 74.

In another exemplary embodiment, the wavelength of the transmitter may be tunable and the wavelength of the light signal can be switch during the operation of the transmitter. The switching sequence has a time span, during which no signal is imprinted on the light signal or transmitted through the transmission medium. During the time span, the system operated with the method enables to set the timing of the phase modulation for the transmitter according to the new selected wavelength.

In still another exemplary embodiment, if the transmitter is RZ format, the RZ carving operation may be suspended when the phase modulation timing setting is performed. Suspending the RZ carving improves the sensitivity of the peak-to-peak detection around the optimized timing as amplitude variations are no longer monitored.

In still another exemplary embodiment, the peak-to-peak detection may be sampled synchronously to the reference phase modulator of the transmitter, to be performed once per symbol at the center of the symbol of the light signal. Ideally, transmitters have low chirp. However, in the case of a transmitter with chirp so that the phase within the symbol gets closer to phase levels mapping different values than the one the symbol has to map, sampling the peak-to-peak value in an area with lower chirp, typically at the center of the symbol at the symbol rate enables to get rid of the chirp and to improve the sensitivity of the detection of the peak-to-peak characteristics. In that case, the peak-to-peak value is detected for one or several points around the middle of the symbol. The peak-to-peak characteristics are detected for amplitudes corresponding to differences of phases with no or lower chirp.

In summary, the timing setting methods of the above-described exemplary embodiments enable to tune the difference of timing of phase modulation of a high order xPSK transmitter within a range of one symbol period in the absolute value, so that the information is correctly mapped by the transmitter. In addition, the timing setting methods of the above-described exemplary embodiments enable fine tuning so that the optimal timing of the transmitter can be found. A transmitter, which has been fine tuned with timing setting methods of the above-described exemplary embodiments, has optimal BER performances when compared with non tuned transmitters of same structure.

The transmitter architectures of the above-described exemplary embodiments enable to set the difference of timing of phase modulation within one symbol period in the absolute value so that the phase information imprinted on the optical carrier emitted by the transmitter concurs with the data fed into the transmitter. The transmitter architectures in the above-described exemplary embodiments also enable also a precise tuning of the timing so that the signal emitted by the transmitter can be received with a minimal BER.

In addition, the timing setting methods of the above-described exemplary embodiments enable to set the timing for both parallel and serial high order xPSK transmitters.

Finally, the timing setting methods of the above-described exemplary embodiments enables to set the timing with low cost and small size components.

The timing setting methods of the above-described exemplary embodiments may be fully automated and used during a calibration of the transmitter.

Timing Setting Examples

A description is first given of the setting of the phase modulation timing of the serial-DQPSK transmitter 400 shown in FIG. 8.

The periodic repetition of the specific pattern of N binary bits is fed to the coder 140 as the binary data pattern 31. The $i^{th}$ symbol of the light signal modulated by the phase modulator 12 have the phase value $\phi_m(i)$ at the output port of the phase modulator Φ. All possible values of $\phi_m(i)$ form the set of phases Φ. The phase modulator 13 modulates the $i^{th}$ symbol of the light signal by $\phi_0(i)$ and this symbol has the phase value $\phi(i)=\phi_m(i)+\phi_0(i)$ at the output port of the phase modulator 13. After passing through the delay interferometer 51, the amplitude of the light signals 72 and 73 for the $i^{th}$ symbol depends on the phase difference $\phi(i)-\phi(i-1)$, as P=1 is fixed by the one-symbol delay interferometer 51.

The timing of the phase the modulation performed by the phase modulator 13 can be tuned across 4 symbols. The modulator 10A maps the following sets of two bits (11, 01, 00, 10) as the following respective phase differences (0, π/2, π, 3π/2); the specific pattern is fed to the coder 14 as the binary data pattern 31 and chosen in order to be mapped on the optical carrier 37 as the following sequence of six symbol phase differences: 0, 3π/2, 3π/2, 3π/2, 3π/2, 0. The binary bit pattern is 12 bit long and it is: 11, 10, 10, 10, 10, 11.

The resulting six consecutive phase states of the optical carrier 37 are (0; 3π/2; π; π/2; 0; 0). This corresponds to the phase modulation sequences (0; π; π; 0; 0; 0) and (0; π/2; 0; π/2; 0; 0), respectively for the first phase modulator 12 and for the second phase modulator 13.

The above-described pattern satisfies all the above-described pattern conditions, where h=4, P=1, φ1=0, φ2=π. The delay interferometer 51 is structured as shown in FIG. 3, where the additional phase adjustment section 83 is set to −π/4.

The specific pattern thus defined follows the definition of the specific pattern hereafter:

1. The duration of the specific pattern is 12 bits (N=12), corresponding to 6 symbols (A=6). It is longer than the tuning range of the timing of phase modulation of the phase modulator 13.
2. The phase difference is taken between directly consecutive symbols, which is coherent with the fact that the chosen delay interferometer 51 is a one-symbol delay interferometer (P=1). The phase difference between symbols can be only 0 or 3π/2, which corresponds to h=4, φ1=0, φ2=π. In that case, the delay interferometer 51 converts this phase difference between symbols into a single amplitude value as it is set for a phase adjusted to −π/4 and as phase values 0 and 3π/2 are symmetrical regarding to the axis of phase −π/4.

3. Any timing different from the perfect match of the second phase modulator 13 results in phase differences between symbols which corresponds to more than one amplitudes after the optical carrier 37 has passed through the one-symbol delay interferometer 51.

Figure 13:
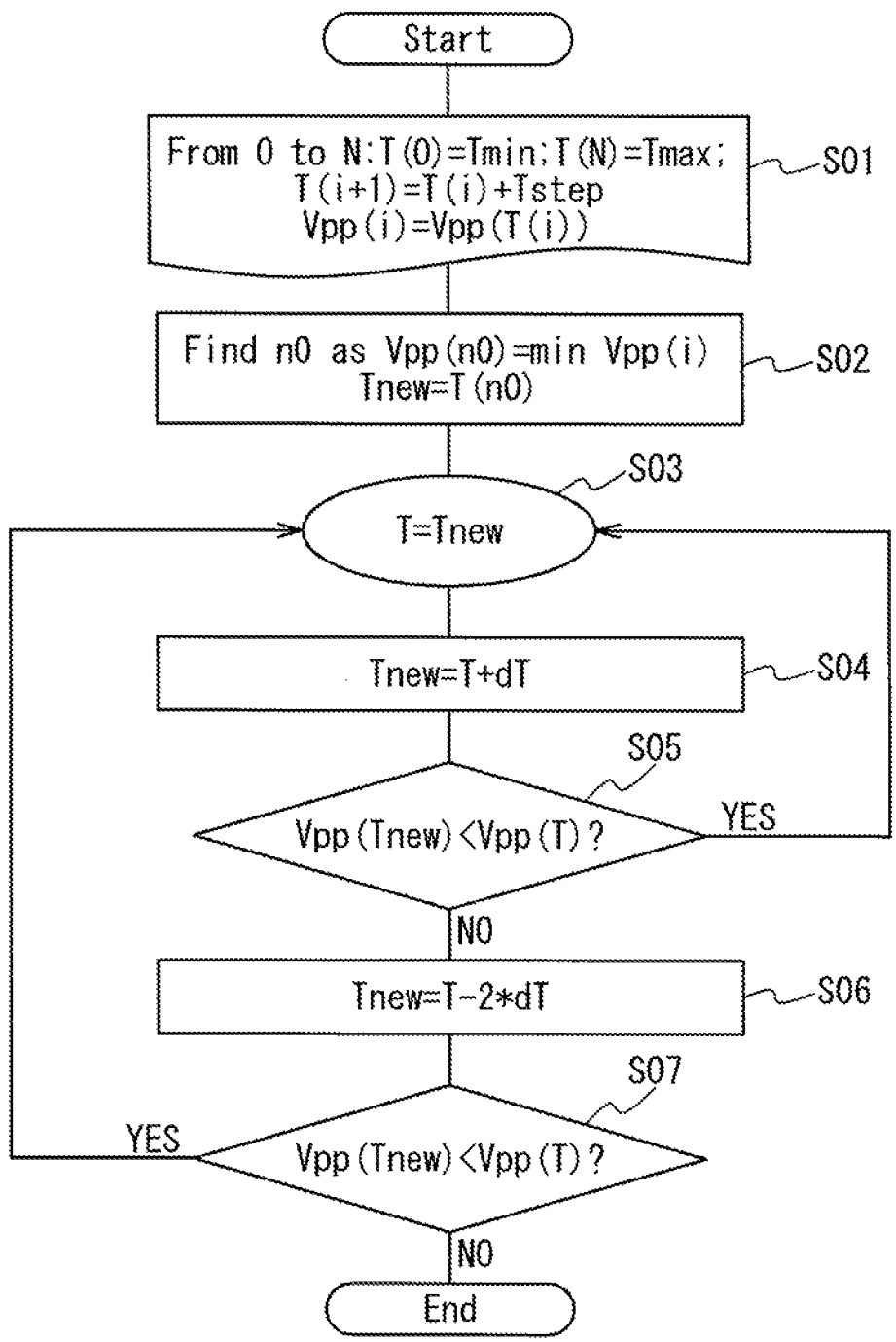
FIG. 13 is the flowchart of an exemplary algorithm, which can be used to optimize the timing with the present invention.
Figure 14:
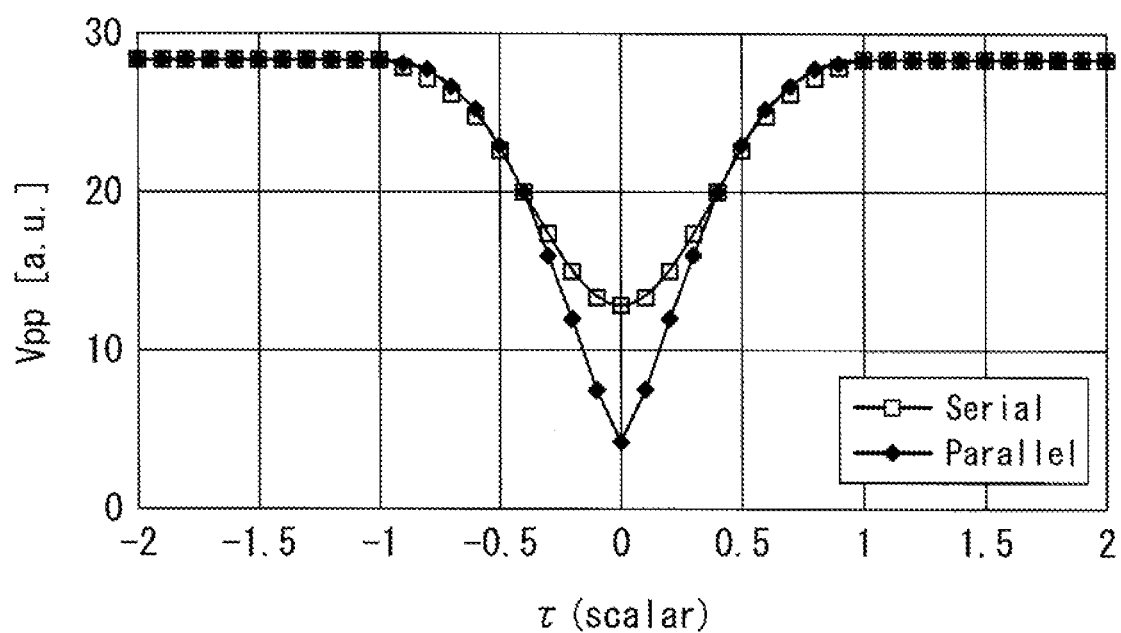
FIG. 14 is a numerical simulation of the variation of the peak-to-peak characteristics detected by a peak-to-peak detection circuit for a serial DQPSK transmitter and a parallel DQPSK transmitter.

When a periodic repetition of the thus defined specific pattern is fed to the coder 14 as the binary data pattern 31, the feedback circuit 62 operates as described on FIG. 13 with the peak-to-peak value detected by the peak-to-peak detector 61, to tune the tunable phase shifter 17 in order to minimize the peak-to-peak value. FIG. 14 shows displays the result of a numerical simulation for this case.

FIG. 13 is an exemplary algorithm used by the feedback circuit 62 to tune the tunable phase shifter 17. Tmin is defined as the minimum timing settable for the phase modulator 13 and Tmax is defined as the maximum timing settable for the phase modulator 13. Tstep is first taken as one symbol period. The first scan is performed on the whole timing setting range with one symbol period step in order to find the timing for which the peak-to-peak voltage (Vpp) monitored by the peak-to-peak detection circuit 61 is minimal. The timing is set to that value. At this point, the timing is set within one symbol period. After that step, dithering the timing by the minimal tuning amount (dT) enables to retrieve the minimum of the peak-to-peak voltage.

A description is then given of the setting of the phase modulation timing of the parallel DQPSK transmitter 600 shown in FIG. 11. The periodic repetition of the specific pattern of N binary bits is fed to the coder 31 as the binary data pattern 31. The $i^{th}$ symbol of the light signal modulated by the phase modulator 12 have the phase value $\phi_m(i)$ before the directional coupler 21. All possible values of $\phi_m(i)$ form the set of phases $\Phi$. The phase modulator 13 modulates the $i^{th}$ symbol of the light signal by $\phi_0(i)$, and therefore this symbol has the phase value $\phi(i)=\phi_m(i)+\phi_0(i)$ in the light signal 37. After passing through the delay interferometer 51, the amplitude of the light signals for the $i^{th}$ symbol depends on the phase difference $\phi(i)-\phi(i-1)$, as P=1 is fixed by the one-symbol delay interferometer 51.

The timing of the phase the modulation performed by the phase modulator 13 can be tuned across 4 symbols. The parallel DQPSK modulator 20A maps the following sets of two bits (11, 10, 00, 01) as the following respective phase differences (0, $\pi/2$, $\pi$, $3\pi/2$).

The thus defined specific pattern is fed to the coder 14 as the binary data pattern 31 and chosen in order to be mapped on the optical carrier 37 as the following sequence of six symbol phase differences: 0, $3\pi/2$, $3\pi/2$, $3\pi/2$, $3\pi/2$ and 0. The binary bit pattern is 12 bit long and it is: 11, 01, 01, 01, 01, and 11.

The resulting six consecutive phase states of the optical carrier 37 are (0; $3\pi/2$; $\pi$; $\pi/2$; 0; 0). This corresponds to the phase modulation sequences (0; 0; $\pi$; $\pi$; 0; 0) and (0; $\pi$; $\pi$; 0; 0; 0), respectively, for the phase modulator 12 and for the phase modulator 13.

The specific pattern thus defined satisfies all the conditions, where h=4, P=1, $\phi_1=0$, $\phi_2=\pi$. The delay interferometer 51 is structured as shown in FIG. 3, where the additional phase adjustment section 83 is set to $-\pi/4$.

This pattern follows the definition of the specific pattern hereafter:

4. The duration of the pattern is 12 bits (N=12), corresponding to 6 symbols (A=6). It is longer than the tuning range of the timing of phase modulation of the phase modulator 13.
5. The phase difference is taken between directly consecutive symbols, which is coherent with the fact that the chosen delay interferometer 51 is a one-symbol delay interferometer (P=1). The phase difference between symbols can be only 0 or $3\pi/2$, which corresponds to h=4, $\phi_1=0$, $\phi_2=\pi$. In that case, the delay interferometer 51 converts this phase difference between symbols into a single amplitude value as it is set for a phase adjusted to $-\pi/4$ and as phase values 0 and $3\pi/2$ are symmetrical regarding to the axis of phase $-\pi/4$.
6. Any timing different from the perfect match of the phase modulator 13 results in phase differences between symbols which corresponds to more than one amplitudes after the optical carrier has passed through the one-symbol delay interferometer 51.

When a periodic repetition of the specific pattern is fed to the coder 14 as the binary data pattern 31, the feedback circuit 62 operates as described on FIG. 13 with the peak-to-peak value detected by the peak-to-peak detection circuit 61, to tune the tunable phase shifter 17 in order to minimize the peak-to-peak voltage. The algorithm used by the feedback circuit 62 for the parallel DQPSK transmitter 600 is same as that for the serial DQPSK transmitter 400 shown in FIG. 8. FIG. 14 displays the result of a numerical simulation for this case.

FIG. 14 displays two curves named "Serial" and "Parallel". X axis expresses the timing difference normalized by the duration of a symbol and Y axis expresses the peak-to-peak voltage in arbitrary units. The curve "Serial" displays the peak-to-peak voltage monitored at the peak-to-peak detection circuit 61 of the serial DQPSK transmitter 400 in function of the difference of timing between the perfect timing for the phase modulation performed by phase modulator 13 and the timing obtained by tuning the tunable phase shifter 17. The curve "Parallel" displays the peak-to-peak voltage monitored at the peak-to-peak detection circuit 61 of the parallel DQPSK transmitter 600 in function of the difference of timing between the perfect timing for the phase modulation performed by at the arm containing the phase modulator 13 and the timing obtained by tuning the tunable phase shifter 17.

It is apparent that the present invention is not limited to the above-described embodiments, which may be modified and changed without departing from the scope of the invention.

The invention claimed is:

1. A method, comprising:
    setting a timing of phase modulation by a target phase modulator within an optical transmitter which performs phase shift keying of an order equal to or higher than four,
    wherein said setting includes:
    feeding a specific pattern to said optical transmitter to allow said optical transmitter to emit an optical carrier in accordance with said specific pattern;
    receiving said optical carrier by a delay interferometer;
    converting a light signal emitted from said delay interferometer into an electrical signal;
    detecting a peak to peak value of said electrical signal, and
    wherein said timing of said phase modulation by said target phase modulator is set so as to minimize said peak to peak value of said electrical signal.

2. The method according to claim 1, wherein said optical transmitter further includes at least one other phase modulator,
    wherein a length A of said specific pattern is chosen so that a time duration of said specific pattern is longer than a setting range of said timing of said phase modulation performed by said target phase modulator,
    wherein said delay interferometer is a P-signal delay interferometer, P being strictly lower than A, wherein said target phase modulator shifts a phase of said light carrier by 0 or $2\pi/h$, h being an integer, wherein there are two phase states $\phi1$ and $\phi2$ in a set $\Phi$ which is a set of phase states susceptible to be imprinted by said at least one other phase modulator, $\phi1$ and $\phi2$ being allowed to be equal, so that $$\Theta(P) \subseteq \Theta_{MAX},$$

$$(\phi2+2\pi|h) \epsilon \Theta(P),$$

where $\Theta_{MAX}$ is a set defined as:

$$\Theta_{MAX}=\{(\phi1); (\phi2+2\pi|h)\}, \text{ and}$$

$\Theta(P)$ is a set defined as:

$$\Theta(P) =\{(\phi(i+P) - \phi(i))\char`\^(0<i<A)\},$$

$\phi(i)$ being defined as $$\phi(i)=\phi_m(i)+\phi_0(i),$$

$\phi_m(i)$ being a phase imprinted by said at least one other phase modulator, and $\phi_0(i)$ being a phase imprinted by said target phase modulator, and wherein, for any non null natural number i strictly lower than A, $$(\exists j\char`\^\exists k)\char`\^(0\leq j<A)\char`\^(0\leq k<A)\char`\^(k\neq j)\char`\^(\psi(i,j)\neq\psi(i,k)), \text{ and}$$

$$(\exists j')\char`\^(0\leq j'<A)\char`\^(\forall k')\char`\^(0k'<A)\char`\^k'\neq j')\char`\^((\psi)i,j')+\psi(i,k'))\neq (\phi1+\phi2+2\pi|h),$$

where $\psi(i,j)$ is defined as:

$$\psi(i,j)=\phi_m(j+P)-\phi_m(j)+\phi_0(i+j+P)-\phi_0(i+j).$$

3. The method according to claim 1, wherein said optical transmitter is a high order differential phase shift keying transmitter of an order equal to or higher than four.

4. The method according to claim 1, wherein said optical transmitter includes an RZ carver providing RZ carving for said optical carrier, wherein said RZ carver is turned off when said peak to peak value of said electrical signal is detected.

5. The method according to claim 1, wherein said peak to peak value is sampled for at least one point around a middle of symbols of said optical carrier, synchronously to modulation of said specific pattern.

6. The method according to claim 1, wherein said setting is recursively performed for all of phase modulators consecutive to a reference phase modulator.

7. The method according to claim 1, wherein said optical transmitter is a serial DQPSK transmitter including first and second modulators which are serially connected,
wherein said first phase modulator modulates said optical carrier by zero or $\pi$ radian,
wherein said second phase modulator modulates said optical carrier by zero or $\pi/2$ radians, and
wherein said target phase modulator is selected out of said first and second phase modulator.

8. The method according to claim 1, wherein said optical transmitter is a parallel DQPSK transmitter including first and second arms which are connected in parallel,
wherein said first arm comprises a first phase modulator modulates said optical carrier by zero or $\pi$ radian;
wherein said second arm comprises:
a second phase modulator modulates said optical carrier by zero or $\pi$ radian; and
an additional phase shifter providing phase shift of $\pi/2$ radians.

9. The method according to claim 1, wherein a wavelength of said optical transmitter is tunable, and
wherein said setting is performed during a wavelength switching sequence of said optical transmitter.

10. A control system for setting a timing of phase modulation by a target phase modulator within an optical transmitter which performs $2^n$ order phase shift keying, n being a natural number equal to or more than two, comprising:
a delay interferometer configured to receive a portion or whole of an optical carrier emitted by said optical transmitter;
a photo-detector converting a light signal emitted from said delay interferometer into an electrical signal;
a peak-to-peak detector detecting a peak-to-peak value of said electrical signal; and
a feedback circuit configured to set a timing of phase modulation performed by said target phase modulator in response to said peak-to-peak value, when a specific pattern is fed to said target phase modulator.

11. The control system according to claim 10, wherein said feedback circuit is configured to set said timing of phase modulation performed by said target phase modulator so as to minimize said peak-to-peak value.

12. The control system according to claim 10, wherein said peak-to-peak value is sampled by said peak-to-peak detector samples for at least one point around a middle of symbols of said optical carrier, synchronously to modulation of said specific pattern.

13. The control system according to claim 10, further comprising a pattern generator adapted to feed a specific pattern used in setting said timing of phase modulation performed by said target phase modulator.

14. The control system according to claim 13, wherein said optical transmitter further includes at least one other phase modulator,
wherein said optical transmitter further includes at least one other phase modulator,
wherein a length A of said specific pattern is chosen so that a time duration of said specific pattern is longer than a setting range of said timing of phase modulation performed by said target phase modulator,
wherein said delay interferometer is a P-signal delay interferometer, P being strictly lower than A,
wherein said target phase modulator shifts a phase of said light carrier by 0 or $2\pi/h$, h being an integer,
wherein there are two phase states $\phi1$ and $\phi2$ in a set $\Phi$ which is a set of phase states susceptible to be imprinted by said at least one other phase modulator, $\phi1$ and $\phi2$ being allowed to be equal, so that $$\Theta(P) \subseteq \Theta_{MAX},$$

$$(\phi2+2\pi|h)\epsilon\Theta(P),$$

where $\Theta_{MAX}$ is a set defined as:

$$\Theta_{MAX}=\{(\phi1);(\phi2+2\pi|h)\}, \text{ and}$$

$\Theta(P)$ is a set defined as:

$$\Theta(P)=\{(\phi(i+P)-\phi(i)\char`\^(0\leq i<A)\},$$

$\phi(i)$ being defined as $$\phi(i)=\phi_m(i)+\phi_0(i),$$

$\phi_m(i)$ being a phase imprinted by said at least one other phase modulator, and $\phi_0(i)$ being a phase imprinted by said target phase modulator, and wherein, for any non null natural number i strictly lower than A, $(\exists j\ \exists k)\ (0 \leq j < A)\ (0 \leq k < A)\ (k \neq j)\ (\psi(i,j) \neq \psi(i,k))$, and $(\exists j')\ (0 \leq j' < A)\ (\forall k')\ (0 k' < A)\ k' \neq j')\ ((\psi)i,j') + \psi(i,k')) \neq (\phi 1 + \phi 2 + 2\pi|h)$, where $\psi(i,j)$ is defined as:

$\psi(i,j) = \phi_m(j+P) - \phi_m(j) + \phi_0(i+j+P) - \phi_0(i+j)$.

15. An optical transmitter performing phase shift keying of an order equal to or higher than four, comprising:
   a plurality of phase modulators modulating an optical carrier;
   a delay interferometer configured to receive a portion or whole of said optical carrier;
   a photo-detector converting an optical signal emitted from said delay interferometer into an electrical signal;
   a peak-to-peak detector detecting a peak-to-peak value of said electrical signal; and
   a feedback circuit adapted to set a timing of phase modulation performed by a targeted one of said phase modulators in response to said peak-to-peak value, when a specific pattern is fed to said target phase modulator.

16. The optical transmitter according to claim 15, further comprising a medium storing a specific pattern,
   wherein, when said timing of phase modulation performed by said targeted one of said plurality of phase modulators is set, said target one of said phase modulators modulates said optical carrier in response to said specific pattern, and
   wherein a length A of said specific pattern is chosen so that a time duration of said specific pattern is longer than a setting range of said timing of said phase modulation performed by said target phase modulator,
   wherein said delay interferometer is a P-signal delay interferometer, P being strictly lower than A,
   wherein said target one of said phase modulators shifts a phase of said light carrier by 0 or $2\pi/h$, h being an integer,
   wherein there are two phase states $\phi 1$ and $\phi 2$ in a set $\Phi$ which is a set of phase states susceptible to be imprinted by said at least one other phase modulator, $\phi 1$ and $\phi 2$ being allowed to be equal, so that $\Theta(P) \hat{=} \Theta_{MAX}$, $(\phi 2 + 2\pi|h) \in \Theta(P)$, where $\Theta_{MAX}$ is a set defined as:

$\Theta_{MAX} = \{(\phi 1); (\phi 2 + 2\pi|h)\}$, and $\Theta(P)$ is a set defined as:

$\Theta(P) = \{(\phi(i+P) - \phi(i))\ (0 \leq i < A)\}$, $\phi(i)$ being defined as $\phi(i) = \phi_m(i) + \phi_0(i)$, $\phi_m(i)$ being a phase imprinted by at least one other phase modulator out of said plurality of phase modulators, and $\phi_0(i)$ being a phase imprinted by said target one of said plurality of phase modulators, and
wherein, for any non null natural number i strictly lower than A, $(\exists j\ \exists k)\ (0 \leq j < A)\ (0 \leq k < A)\ (k \neq j)\ (\psi(i,j) \neq \psi(i,k))$, and $(\exists j')\ (0 \leq j' < A)\ (\forall k')\ (0 k' < A)\ k' \neq j')\ ((\psi)i,j') + \psi(i,k')) \neq (\phi 1 + \phi 2 + 2\pi|h)$, where $\psi(i,j)$ is defined as:

$\psi(i,j) = \phi_m(j+P) - \phi_m(j) + \phi_0(i+j+P) - \phi_0(i+j)$.

17. The optical transmitter according to claim 15, wherein said feedback circuit is configured to set said timing of phase modulation performed by said targeted one of said phase modulators so as to minimize said peak-to-peak value.

18. The optical transmitter according to claim 15, wherein said transmitter is a serial DQPSK transmitter,
   wherein said plurality of phase modulators include first and second phase modulators connected in series,
   wherein said first phase modulator modulates said optical carrier by zero or $\pi$ radian,
   wherein said second phase modulator modulates said optical carrier by zero or $\pi/2$ radians, and
   wherein said delay interferometer is a one-symbol delay interferometer.

19. The optical transmitter according to claim 15, wherein said transmitter is a parallel DQPSK transmitter including first and second arms,
   wherein said plurality of phase modulators include first and second phase modulators both modulating said optical carrier by zero or $\pi$ radian,
   wherein said first arm comprises said first phase modulator,
   wherein said second arm comprises:
   said second phase modulator; and
   an additional phase shifter providing phase shift of $\pi/2$ radians, and
   wherein said delay interferometer is a one-symbol delay interferometer.

20. The optical transmitter according to claims method according to claim 15, further comprising an RZ carver providing RZ carving for said optical carrier,
   wherein said RZ carver is turned off when said peak to peak value of said electrical signal is detected.

21. The optical transmitter according to claim 15, wherein said peak to peak value is sampled by said peak-to-peak detector for at least one point around a middle of symbols of said optical carrier, synchronously to modulation of said specific pattern.

22. An optical transponder comprising:
   an xPSK modulator performing phase shift keying of an order equal to or higher than four, including a plurality of phase modulators;
   a demodulator including: a plurality of delay interferometers adapted to receive a portion or whole of an optical carrier emitted by said xPSK modulator; and a plurality of photo-detectors converting light signals respectively received form said delay interferometers into electrical signals;
   a peak-to-peak detector detecting a peak-to-peak value of one of said electrical signals; and
   a feedback circuit adapted to set a timing of phase modulation performed by a target one of said phase modulators in response to said peak-to-peak value, when a specific pattern is fed to said target phase modulator.

* * * * *